(12) United States Patent
Sonoda et al.

(10) Patent No.: US 6,622,004 B1
(45) Date of Patent: Sep. 16, 2003

(54) DATA TRANSCEIVING SYSTEM AND METHOD

(75) Inventors: Yasuyuki Sonoda, Kyoto (JP); Keisei Yamamuro, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 629 days.

(21) Appl. No.: 09/588,182

(22) Filed: Jun. 7, 2000

(30) Foreign Application Priority Data

Nov. 30, 1999 (JP) ............................................. 11-340244
Jun. 7, 1999 (JP) ............................................. 11-159038

(51) Int. Cl.⁷ ................................................. H04H 1/00
(52) U.S. Cl. .................... 455/3.05; 455/3.06; 455/3.02; 455/12.1; 711/3; 711/117; 711/147; 725/63; 725/48
(58) Field of Search ................................ 455/3.05, 3.06, 455/12.1, 13.1, 3.02; 711/3, 117, 147; 725/68, 145, 63, 4, 48, 49, 64

(56) References Cited

U.S. PATENT DOCUMENTS 5,913,223 A  * 6/1999 Sheppard et al. ............ 711/118

| | | | | |
|---|---|---|---|---|
| 6,259,891 B1 | * | 7/2001 | Allen | 455/3.02 |
| 6,317,885 B1 | * | 11/2001 | Fries | 725/109 |
| 6,415,133 B1 | * | 7/2002 | Brede et al. | 455/3.05 |
| 6,493,043 B1 | * | 12/2002 | Bollmann et al. | 711/132 |
| 2002/0091816 A1 | * | 7/2002 | Stalker | 709/224 |

FOREIGN PATENT DOCUMENTS

| EP | WO 95/25306 | * | 9/1995 | G06F/12/08 |
|---|---|---|---|---|
| EP | 0883276 | * | 9/1998 | H04N/1/00 |
| EP | 0880100 | * | 11/1998 | G06F/12/12 |

* cited by examiner

Primary Examiner—William Trost
Assistant Examiner—Earl J Moorman, III
(74) Attorney, Agent, or Firm—Nixon Peabody LLP; Donald R. Studebaker

(57) ABSTRACT

An object is to make efficient pre-reading possible even in receivers having little memory for receiving. A CPU 147 acquires data size in each module by referring module control information for a received DII, (step S39). The data sizes of the modules are compared with the remaining memory in a RAM 144 (step S45), and modules smaller than the remaining memory are pre-read into the RAM 144 (step S47). When a pre-read flag is not on, then no pre-reading is done even when a module is smaller than the remaining memory. Thus data that are updated from time to time can be excluded from being subject to pre-reading.

33 Claims, 42 Drawing Sheets

FIG.5

| P I D | CONTENTS DATA |
|---|---|

FIG.6

PMT111 (PID=0×0011)

| VIDEO PID | AUDIO PID |
|---|---|
| 0×0022 | 0×0024 |

FIG.7

PMT114 (PID=0X0014)

| ENTRY PAGE MODULE id | DATA PID |
|---|---|
| 0001/0001 | 0X0025 |

FIG.8

PAT     (PID=0X0000)

| SERVICE | PMT PID |
|---------|---------|
| 1011    | 0X0011  |
| 1012    | 0X0012  |
| 1013    | 0X0013  |
| 1014    | 0X0014  |

| NIT PID |
|---------|
| 0X0018  |

FIG.9

NIT (PID=0X18)

| TS | TRANSMISSION DATA | SERVICE LIST |
|---|---|---|
| 1010 | f1 | 1011,1012,1013,1014 |
| 1020 | f2 | 1021,1022,1023,1024 |
| ⋮ | ⋮ | ⋮ |

FIG.16

```
<info>
        module" OOOO"

</info>
<graphic>
        " index.jpg"
        " start.bmp"                                          411S
<graphic>
<script>
        if (pushed_key="O") then (goto module"OOO1")
</script>
```

FIG.18

```
<info>
        module"0001"
</info>
<graphic>
        "FOOD PRODUCTS.bmp"
        "STATIONARY SUPPLIES.bmp"
        "ELECTRICAL APPLIANCES.bmp"
        "end.bmp"                                              421S
</graphic>
<script>
    if (pushed_key="1") then (goto module"0111")
    if (pushed_key="2") then (goto module"0211")
    if (pushed_key="3") then (goto module"0311")
    if (pushed_key="0") then (goto module"0000")
</script>
```

FIG.20

```
<info>
        module" 0 1 1 1 "
</info>
<graphic>
        " meat.jpg"
              ┆
              ┆
<graphic>
<script>
    if (pushed_key="0")  then (command-buy"meat")      — 439S
    if (pushed_key="1")  then (goto module"0 1 1 2")   — 431S
    if (pushed_key="2")  then (goto module"0 1 1 3")
    if (pushed_key="3")  then (goto module"0 1 1 4")
    if (pushed_key="4")  then (goto module"0 1 1 5")
    if (pushed_key="5")  then (goto module"0 0 0 1")

</script>
```

FIG.23

| MODULE id | MODULE SIZE (BYTES) | CATEGORY | FLAG |
|---|---|---|---|
| 0000 | 20K | CATEGORY 0 | 1 |
| 0001 | 10K | CATEGORY 0 | 1 |
| 0111 | 50K | CATEGORY 1 | 1 |
| 0112 | 60K | CATEGORY 1 | 1 |
| ⋮ | ⋮ | ⋮ | ⋮ |
| 0115 | 80K | CATEGORY 1 | 1 |
| 0211 | 50K | CATEGORY 2 | 1 |
| ⋮ | ⋮ | ⋮ | ⋮ |

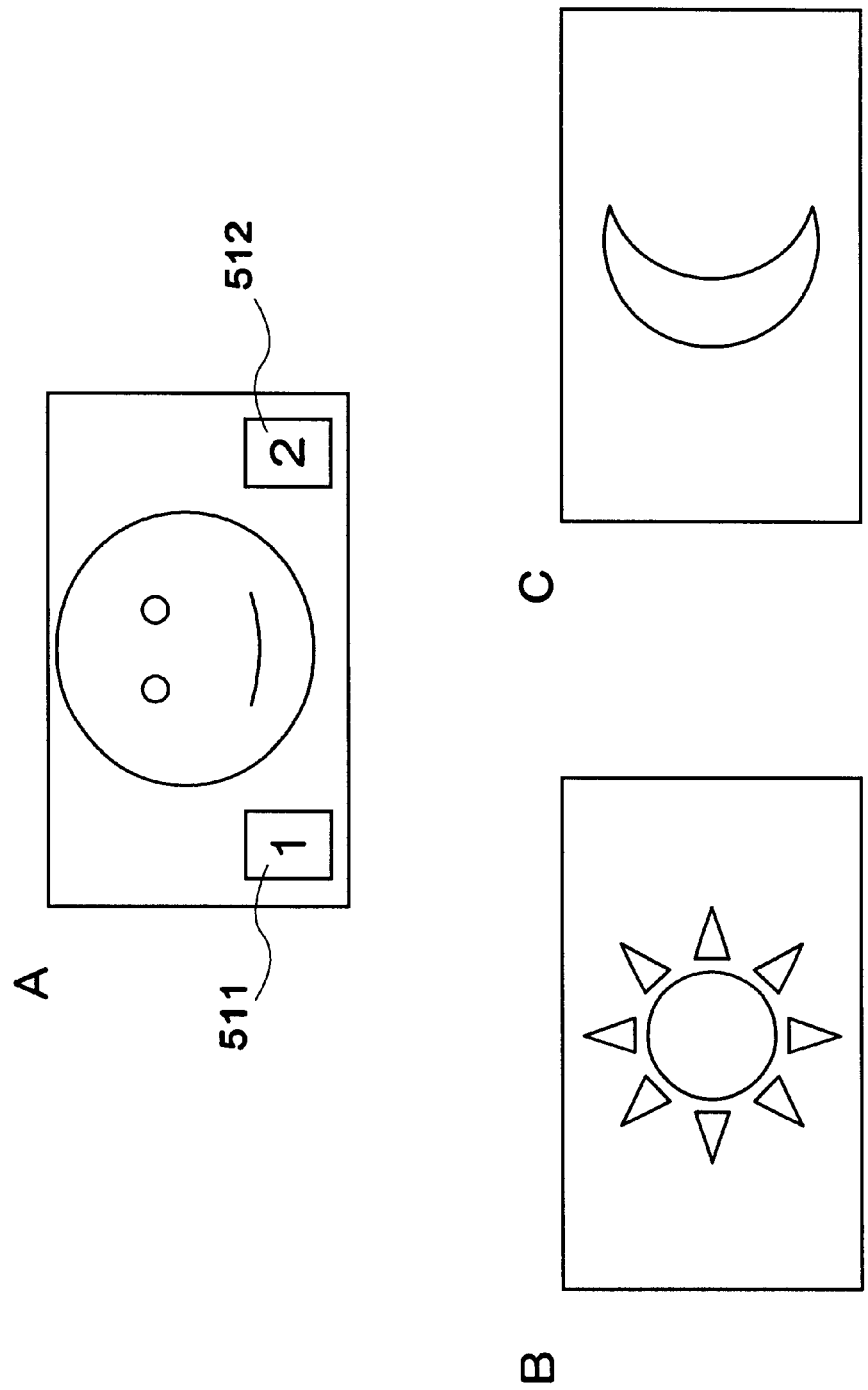

```
<info>
        module"0"
</info>
<graphic>
        "face&button.bmp"
        (FIG.25A VIDEO DATA)
</graphic>
<script>
        if(pushed_key"1")
            then(goto module"1")
        if(pushed_key"2")
            then(goto module"2")
</script>
```

B

```
<info>
</info>
<graphic>
        "sun.bmp"
        module"1"
        (FIG.25B VIDEO DATA)
</graphic>
<script>
</script>
```

C

```
<info>
</info>
<graphic>
        "moon.bmp"
        module"2"
        (FIG.25C VIDEO DATA)
</graphic>
<script>
</script>
```

FIG.27

Content -Type : multipart/mixed ; boundary = "boundary-sample"  
Content -Base : arib-dc : //0004.0001.0100.0020/40/0001/  
Content -Length : 23055  
Content -Location :

— 1501
— 1502
— 1503

--boundary-sample  
Content -Type : application/X - arib - resourceList  
Content - Length : 76  
Content - Location :

001000····  
00001010····

} 1504

--boundary-sample  
Content -Type :text/X - arib - bml ; charset = "euc - jp"  
Content - Length : 14898  
Content - Location : niko . bml

} 1505

<?xml version = "1.0" encoding = "EUC - JP"?>  
<?bml - version = "1.0"?>

} 1506

<bml>  
<head>  
<title> SAMPLE CONTENTS </title>  
<style type = "text/css">  
<![CDATA[  
   .selflame{  
      background - color - index : 8  
      border - style : solid ;  
      border - width : 3px ;  
      border - top - color - index : 8 ;  
      border - left - color - index : 8 ;  
      border - right - color - index : 8 ;  
      border - bottom - color - index : 8 ;  
   }

```
        div : focus{
                border - top - color - index : 3 ;
                border - left - color - index : 3 ;           ─1511
                border - right - color - index : 3 ;
                border - bottom - color - index : 3 ;
        }
]]>
</style>
<script>
<![CDATA[
function GoTo1 ( ) {
    browser. launchDocument ( "/40/0001/sun. bml" , "cut" ) ;
}
function GoTo2 ( ) {
    browser. launchDocument ( "/40/0002/moon. bml" , "cut" ) ;
}
]]>
</script>
</head>
                                                              1512

<body style = "background - color - index : 8 ;
        resolution : 960x540 ;                                ─1513
        clut : url (clut) ; ">

<! -- basebutton & picture -->

<div style = "width : 960px; hight : 540px; left : 0px; top : 0px;
        background - color - index : 8 ; ">
<! -- button -->
<object type ="image/X - arib - png" data = "1_button. png"
    style = "width : 42px; height : 42px; left : 12px; top : 462px; "/>

<object type ="image/X - arib - png" data = "2_button. png"
    style ="width : 42px; height : 42px; left : 882px; top : 462px; "/>
                                                              1514
```

FIG.29

```
</div>

<!-- selected flames -->
<div id = "to1" class = "selflame"
    <onclick = "GoTo1( );"
    style = "width : 50px; height : 50px; left : 20px; top : 470px;
            nav-index : 0; nav-right : 1;"/>
<div id = "to2" class = "selflame"
    onclick = "GoTo2( );"
    style = "width : 50px; height : 50px; left : 890px; top : 470px;
            nav-index : 1; nav-right : 0;"/>
</body>
</bml>
```
⎬ 1521

```
--boundary-sample
Content -Type : application/X - arib - png
Content - Length : 3500
Content - Location : 1_button. png

100111····
11000101····
```
⎬ 1522

```
--boundary-sample
Content -Type : application/X - arib - png
Content - Length : 3800
Content - Location : 2_button. png

```
<?xml version = "1.0" encording = "EUC - JP"?>
<?bml - version = "1.0"?>

<bml>
<head>
<title> SAMPLE CONTENTS </title>
<style type = "text/css">
        .selflame{
                background - color - index : 8
                border - style : solid ;
                border - width : 3px ;
                border - top - color - index : 8 ;
                border - left - color - index : 8 ;
                border - right - color - index : 8 ;
                border - bottom - color - index : 8 ;
        }
        div : focus{
                border - top - color - index : 3 ;
                border - left - color - index : 3 ;
                border - right - color - index : 3 ;
                border - bottom - color - index : 3 ;
        }
</style>
<script>
<![CDATA[
browser. setCachePriority ( "/40/0001",127 ); ─────1541
browser. setCachePriority ( "/40/0002",127 ); ─────1542
function GoTo1 ( ) {
        browser. launchDocument ( "/40/0001/sun. bml" , "cut" ) ;
}
function GoTo2 ( ) {
        browser. launchDocument ( "/40/0002/moon. bml" , "cut" ) ;
}
]]>
</script>
</head>
```

DATA TRANSCEIVING SYSTEM AND METHOD

CROSS REFERENCE TO RELATED APPLICATIONS

All the contents disclosed in Japanese Patent Application No. Hei11-159038 (filed on Jun. 7, 1999) and Hei11-340244 (filed on Nov. 30, 1999), including specifications, claims, drawings and abstract, are integrated with the present application by cross-reference to all these disclosed contents.

BACKGROUND OF THE INVENTION

1. Field of the Invention

This invention relates to a data transceiving system, and particularly to the pre-reading control of module data transmitted in a carousel sending scheme.

2. Description of the Related Art

Data transmission services are now known which use satellites. These are services wherein, at a broadcast station, module data are repeatedly transmitted in a carousel sending scheme, and, at the receiver end, only necessary module data are received and displayed.

In such a transceiver system, data are repeatedly transmitted in a carousel sending scheme, wherefore it is possible to pre-read the transmitted data beforehand into the cache area of a memory in the receiver. By such pre-reading, it becomes possible to display data from hyperlinked files merely by reading them out from the cache area, making high-speed display possible.

There are limits, however, to the memory capacity used for the cache area in the receiver. And, conversely, with the carousel sending scheme, there are cases where a file is transmitted while being updated. That being so, there are cases where unlimited pre-reading becomes meaningless.

SUMMARY OF THE INVENTION

An object of the present invention is resolve the problems described in the foregoing, providing a data receiver that has only limited memory area, wherewith acquisition of necessary data is possible in a shorter time.

A data receiver that, out of module data transmitted in a carousel sending scheme with module identifiers attached, selectively receives module data to which prescribed module identifiers are attached, comprises:

module data selection means for selecting module data matching given selection conditions, and outputting those module data;

memory means capable of storing said data so output;

pre-read control means for sending selection conditions for pre-reading module data associated with module data output by said module data selection means to said module data selection means; and empty capacity acquisition means for acquiring empty capacity in said memory means; wherein:

said pre-read control means decide whether or not volume of data in said module data subject to pre-reading is smaller than said empty capacity acquired and, when said volume of data in said module data is smaller, send selection conditions to said module data selection means so that those module data subject to pre-reading are selected.

A data receiver that, out of module data transmitted in a carousel sending scheme with module identifiers attached, selectively receives module data to which prescribed module identifiers are attached, comprises:

module data selection means for selecting module data matching given selection conditions, and outputting those module data;

memory means capable of storing said data so output; and pre-read control means for sending selection conditions for pre-reading module data associated with module data output by said module data selection means to said module data selection means;

said data receiver further comprising:

empty capacity acquisition means for acquiring empty capacity in said memory means; and total data volume acquisition means for acquiring total data volume of module data belonging to a group; wherein:

said pre-read control means decide whether or not total data volume in a group to which said module data subject to pre-reading belong is smaller than said acquired empty capacity and, when said total data volume is smaller, send selection conditions to said module data selection means so that all module data belonging to that group are selected.

A data receiver that, out of module data transmitted in a carousel sending scheme with module identifiers attached, selectively receives module data to which prescribed module identifiers are attached, comprises:

module data selection means for selecting module data matching given selection conditions, and outputting those module data;

memory means for storing said data so output;

data read means for searching said memory means and reading out needed data when a data read command is sent thereto;

pre-read control means for sending selection conditions to said module data selection means for pre-reading module data associated with data output to said memory means by said module data selection means; and empty capacity securing means for securing empty area in said memory means larger than said data volume, so that module data subject to pre-reading sent from said module data selection means will be pre-read beforehand in said memory means.

While the novel features of the invention are set forth in a general fashion, both as to organization and content. Other objects and features of the present invention will be more apparent to those skilled in the art on consideration of the accompanying drawings and following specification wherein are disclosed several exemplary embodiments of the invention with the understanding that such variations, modifications and elimination of parts may be made therein as fall within the scope of the appended claims without departing from the spirit of the invention.

BRIEF DESCRIPTION OF THE DRAWINGS

FIG. 5 is a diagram of the structure of packeted data;

FIG. 6 is a diagram of the content of control data PMT1;

FIG. 7 is a diagram of the content of control data PMT4;

FIG. 8 is a diagram of the content of control data PAT;

FIG. 9 is a diagram of the content of control data NIT;

FIG. 16 represents the data in module 0000;

FIG. 18 represents the data in module 0001;

FIG. 20 represents the data in module 0111;

FIG. 23 shows module control data partially represented in tabular form;

FIGS. 25A, 25B, and 25C are examples of data broadcast displays, where FIG. 25A is an example for module 0, FIG. 25B and example for module 1, and FIG. 25C an example for module 2;

FIG. 26 gives examples of the data configuration programming of FIG. 25, where FIG. 26A is an example for module 0, FIG. 26B and example for module 1, and FIG. 26C an example for module 2;

FIG. 27 is an example of BML data;

FIG. 28 is an example of BML data;

FIG. 29 is an example of BML data;

FIG. 42 is an example of BML data wherein priority is programmed.

DESCRIPTION OF THE PREFERRED EMBODIMENTS

1. Functional block diagram
   1-1. Satellite broadcast system overview
      1-1-1. How electromagnetic signals are sent in satellite broadcasting
      1-1-2. Overview of transmitting unit
      1-1-3. Transport stream configuration
      1-1-4. Overview of receiver
   1-2. First embodiment
      1-2-1. Transmitting unit
      1-2-2. Receiver
         1-2-2-1. Hardware configuration
         1-2-2-2. Reception control program
         1-2-2-3. Display program
         1-2-2-4. Pre-reading program
   1-3. Other embodiments
   1-4. Previous filing disclosure
2. Embodiment for controlling empty area
   2-1. Block diagram
   2-2. Flowchart
   2-3. Other embodiments

1. Description of Functional Blocks

Figure 1:
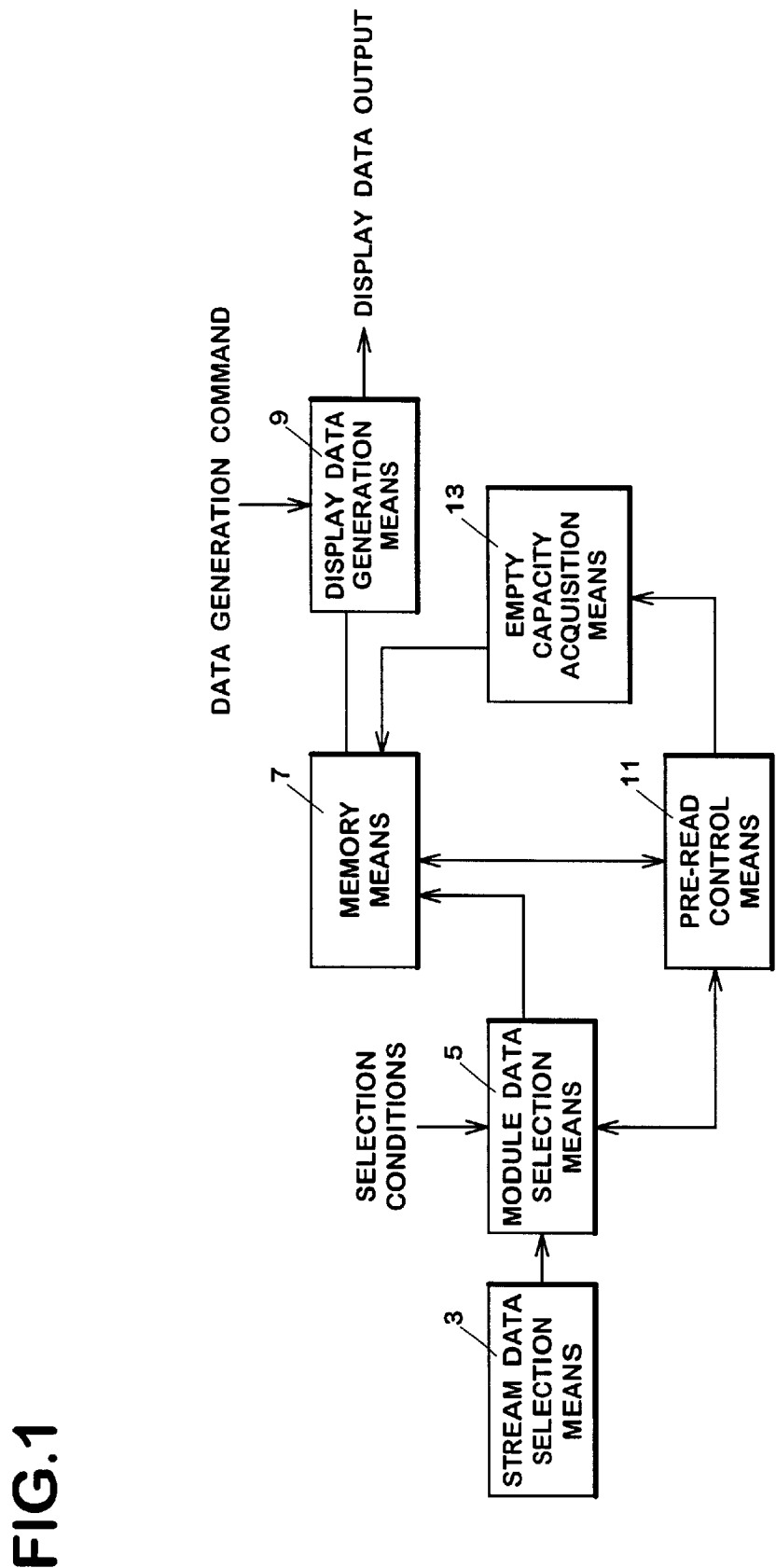
FIG. 1 is a functional block diagram of a receiver relating to the present invention.

In FIG. 1 is given a functional block diagram of a data receiver 1 relating to the present invention.

The data receiver 1 indicated in FIG. 1 is a data receiver that, of the module data transmitted in a carousel sending scheme to which a module identifier is attached, selectively receives module data to which a prescribed module identifier is attached. This data receiver 1 comprises stream data selection means 3, module data selection means 5, memory means 7, display data generation means 9, pre-reading control means 11, and empty capacity acquisition means 13.

The stream data selection means 3 selectively receive, from multiple service multiplexed stream data, service multiplexed stream data that match given conditions. The term service multiplexed stream data is stream data which is multiplexed module data that configure multiple services, corresponding to a transport stream in the following embodiments.

The module data selection means 5 select, from given data multiplexed stream data, module data which match given selection conditions, and output those module data. The memory means 7 store data output from the module data selection means 5.

The display data generation means 9, when a data generation command is given, read out data stored in the memory means 7 and generate display data. The pre-reading control means 11 send selection conditions for pre-reading module data related to data output by the module data selection means 5 to the module data selection means 5. The empty capacity acquisition means 13 acquire empty capacity in the memory means 7.

The pre-reading control means 11 determine whether or not the data volume of the module data that are the object of the pre-reading noted above is smaller than the noted acquired empty capacity and, when the data volume of those module data is the smaller, send selection conditions to the module data selection means 5 so that those module data will be selected. When the module data that are the object of the pre-reading are output from the module data selection means 5, the memory means 7 store those data. The display data generation means 9, when a data generation command is given, generate display data using those data stored in the memory means 7 which are the necessary data. Accordingly, it is possible to generate display data that use data pre-read beforehand.

It is also permissible to provide, instead of the display data generation means 9, read-out means for reading out data stored in the memory means 7 when a read-out command is given.

1-1. Satellite Broadcast System Overview

A case is described now where the present invention is applied to satellite broadcasting. It can also be applied to land-based signal broadcasting or to such line-based broadcasting as cable television so long as that is broadcasting which transmits data formed into module data.

1-1-1. How Radio Waves Are Sent in Satellite Broadcasting

Figure 2:
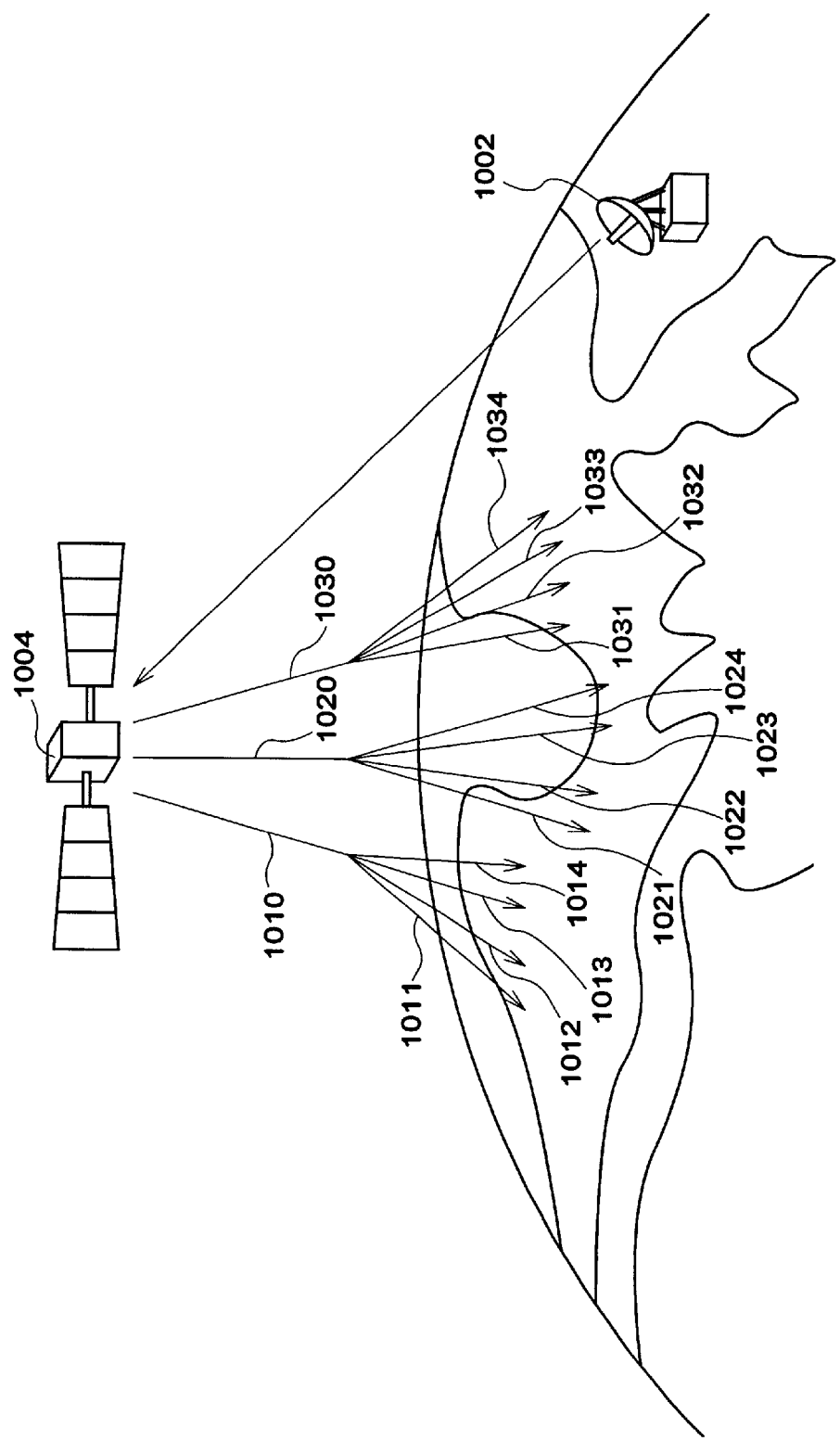
FIG. 2 is a diagram showing how electromagnetic signals are sent in satellite communications.

In FIG. 2 is presented a model diagram of how electromagnetic signals are sent in satellite broadcasting. An electromagnetic signal is sent from a land station 1002 via a satellite 1004 back down to the ground. A plurality of transport streams 1010, 1020, and 1030 are sent from the satellite 1004. Each transport stream is distinguished by its frequency and plane of polarization, etc.

In the transport stream 1010, multiple services (corresponding to the channels in land-based broadcasting) 1011, 1012, 1013, and 1014 are packeted and multiplexed by time division. Simultaneously, the services 1021, 1022, 1023, and 1024 in the transport stream 1020 are multiplexed, and the services 1031, 1032, 1033, and 1034 in the transport stream 1030 are multiplexed. In the transport streams, moreover, in addition to the image data and audio data of the services, are sent control data for indicating program information, control data for indicating the current time, and the necessary control data associated with packeting, etc. Only three transport streams are diagrammed in FIG. 2, but in actual practice, many more transport streams are sent. In FIG. 2, moreover, four services are multiplexed for each transport stream, but in actual practice many more services are multiplexed.

1-1-2. Overview of Transmitting Unit

Figure 3:
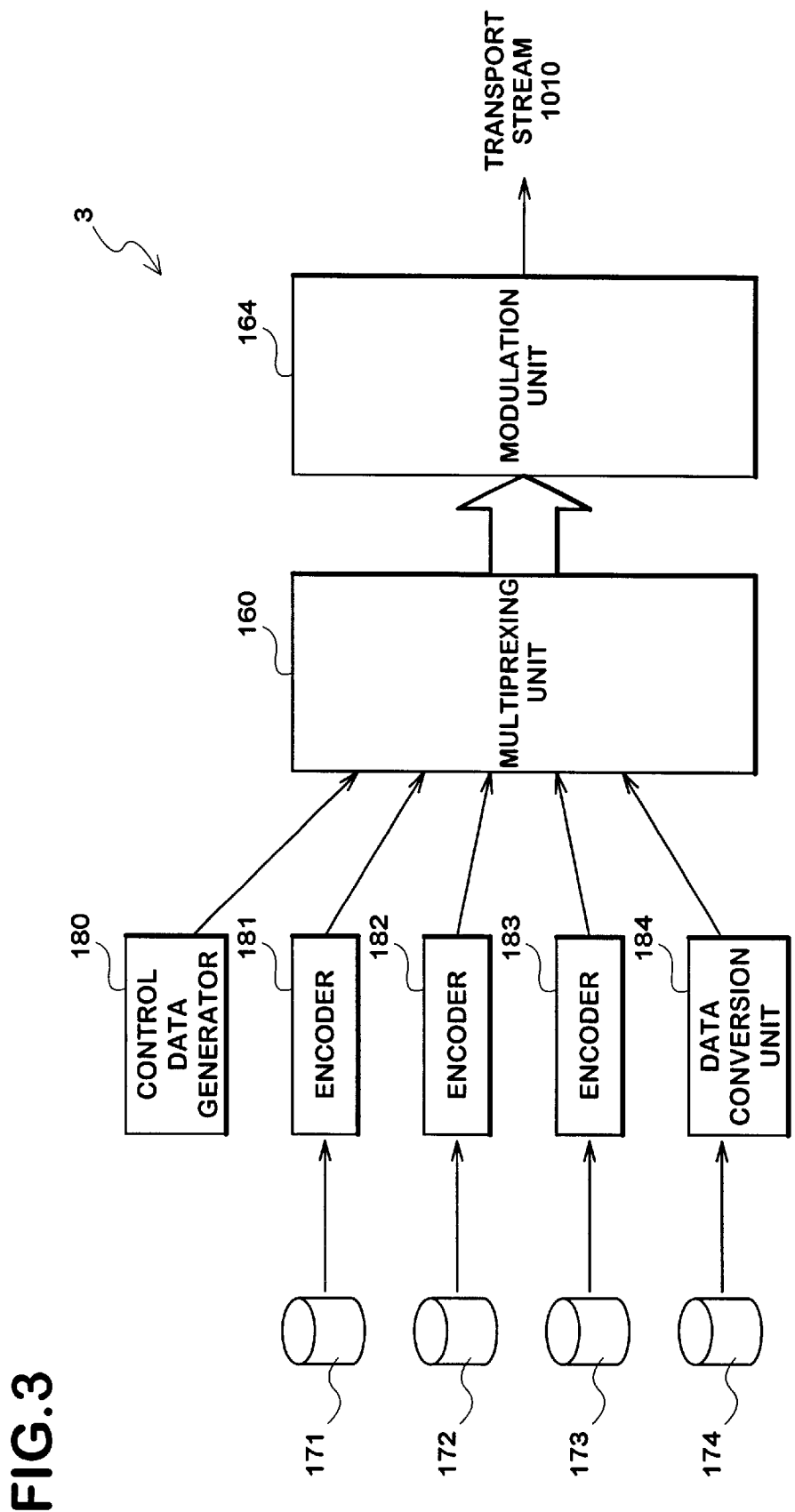
FIG. 3 is a general diagram of a transmitter.

In FIG. 3 is diagrammed the configuration of a transmitting unit for generating and transmitting the transport streams described above. In this diagram, only one transport stream 1010 is represented, but the other transport streams 1020 and 1030 are generated in the same way.

Image and audio data for the service 1011 are stored in the data memory unit 171. These data are encoded by the encoder 181 and sent to the multiplexer 160. Similarly, image and audio data for the services 1012 and 1013 are stored, respectively, in the data memory units 172 and 173. The image data are encoded by the encoder 182 according to the MPGE2 video standard, and the audio data are encoded by the encoder 183 according to the MPGE2 audio standard, and those encoded data are sent to the multiplexer 160.

Self-descriptive data for the service 1014 are stored in the data memory unit 174. These data are converted to modules to which object headers are added, by the data conversion unit 184, based on the MPGE2 system standard. A module ID is set for each module. The details of this setting processing will be described subsequently.

The control data generator 180 generates control data for packet multiplexing, control data for displaying program information, and control data for displaying the current time, etc. The control data for packet multiplexing are added for such purposes as correctly identifying the image and/or audio data for the multiple services which have been packeted by time division.

The multiplexer 160 time-division multiplexes data sent from the control data generator 180, from the encoders 181 to 183, and from the data conversion unit 184, producing fixed-length packets which it outputs as the transport stream 1010.

The multiplexer 160, furthermore, takes the data sent from the data conversion unit 184, divides them into sections based on the DSM-CC standard, and stores an identifier for that module in the header of each section. In this embodiment, the module identifiers are stored in a table ID extension field.

The modulator 164 modulates sections sent thereto and outputs them as a transport stream. The transport streams output are broadcast to viewers via the broadcast satellite 1004.

The sections are divided into TS sections, based on the MPEG standard, and transmitted.

1-1-3. Transport Stream Configuration

Figure 4:
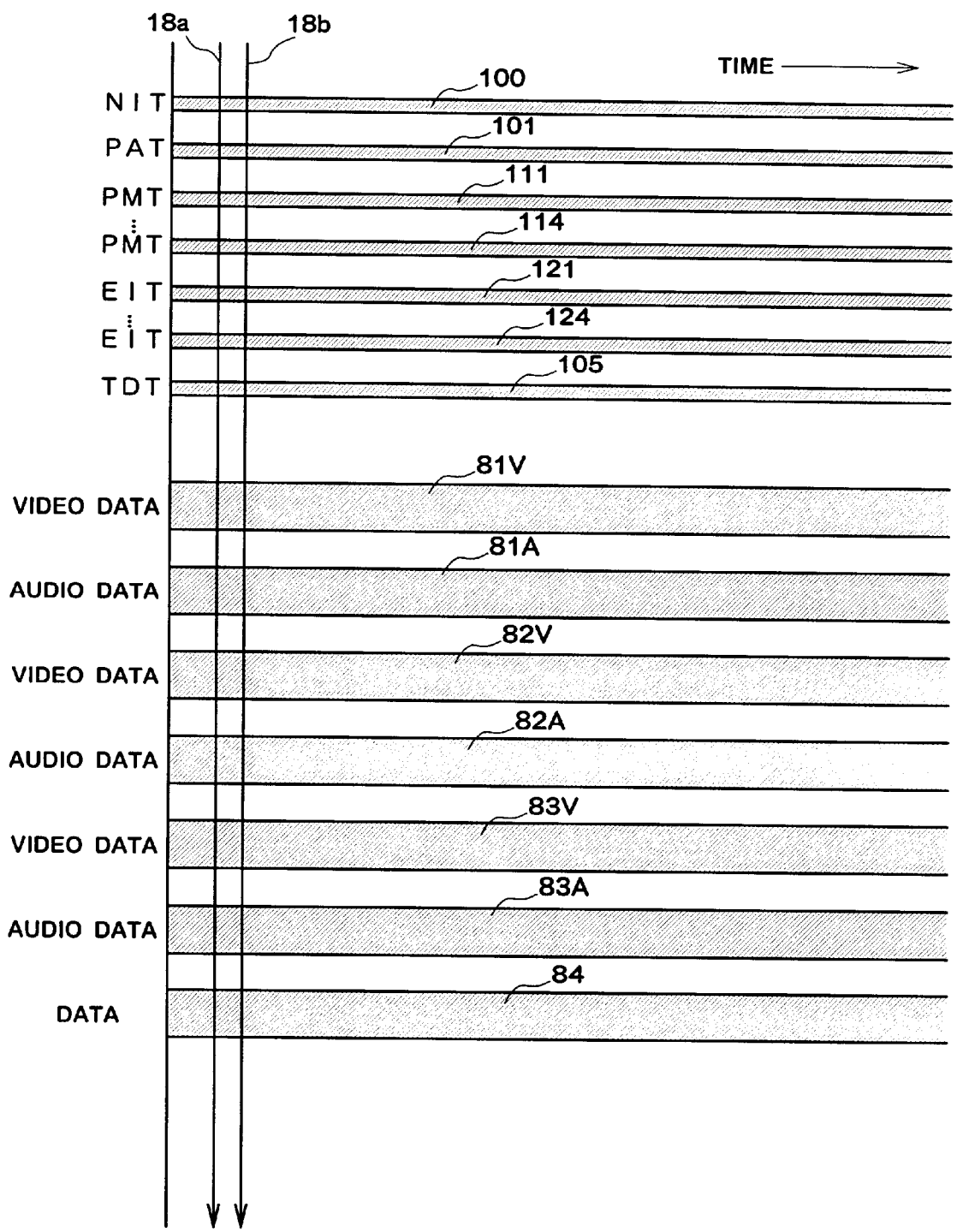
FIG. 4 is a diagram representing a transport stream transmitted in satellite broadcasting.

In the transport stream 1010 generated by the transmitting unit diagrammed in FIG. 3 are multiplexed the video data 81V and audio data 81A for the service 1011, the video data 82V and audio data 82A for the service 1012, the video data 83V and audio data 83A for the service 1013, the data 84 for the service SV14, as diagrammed in FIG. 4, and also a correspondence table 109. The correspondence table 109 will be described subsequently. A DII, described subsequently, is multiplexed in the data 84.

The control data NIT 100, PAT 101, and PMT 111 to PMT 114 for packet multiplexing are also multiplexed. Using these control data, as will be described later, the data for the multiplexed services 1011, 1012, 1013, and 1014 can be separated. Also multipexed are control data EIT 121 to EIT 124 for displaying program information, and control data TDT 105 for displaying the current time, etc. Furthermore, while not shown in the diagram, much control data such as scramble data, etc., are multiplexed.

The control data PMT 111 and EIT 121 are for the service 1011, the control data PMT 112 and EIT 122 are for the service 1012, the control data PMT 113 and EIT 123 are for the service 1013, and the control data PMT 114 and EIT 124 are for the service 1014.

Packeting is performed as represented by the vertical line 18a in FIG. 4. That is, pocketing is performed in the order of control data NIT, PAT, PMT, EIT, and TDT, video data 81V, audio data 81A, video data 82V, audio data 82A, video data 83V, audio data 83A, and data 84. When the pocketing up to and including data 84 is completed, the packeting from the control data NIT and following is repeated (cf. vertical line 18b). This multiplex processing is executed on the basis of predetermined multiplexing information (not shown).

In FIG. 5 is diagrammed the basic structure of packeted data. Both control data and video and audio data are made into packets having the data structure diagrammed in FIG. 5. A packet ID (PID) is added at the beginning of the packeted data. The packet ID is a code that is uniquely attached to each packet to identify that packet. The content data are the subject data that are packeted (i.e. control data, video and audio data, and self-descriptive data, etc.).

In FIG. 6 is diagrammed the data content for the control data PMT 111 for packet multiplexing. To PMT 111 are written the packet ID for the video data 81V and audio data 81A for the service 1011. Similarly, to the PMT 112 and PMT 113 are written the packet IDs for the services 1012 and 1013, respectively.

As diagrammed in FIG. 7, to the PMT 114 is written the packet ID for the data 84 for the service 1014.

As diagrammed in FIG. 8, to the PAT are written the packet ID for the PMT 111 corresponding to the service 1011, the packet ID for the PMT 112 corresponding to the service 1012, the packet ID for the PMT 113 corresponding to the service 1013, and the packet ID for the PMT 114 corresponding to the service 1014.

As diagrammed in FIG. 9, to the NIT are written such transmission specifications as the frequency and plane of polarization for all of the transport streams 1010 to 1040, and a list of services multiplexed in those transport streams. Thus it can be known to which frequency transport stream a specific service has been multiplexed.

1-1-4. Overview of Receiver

Figure 10:
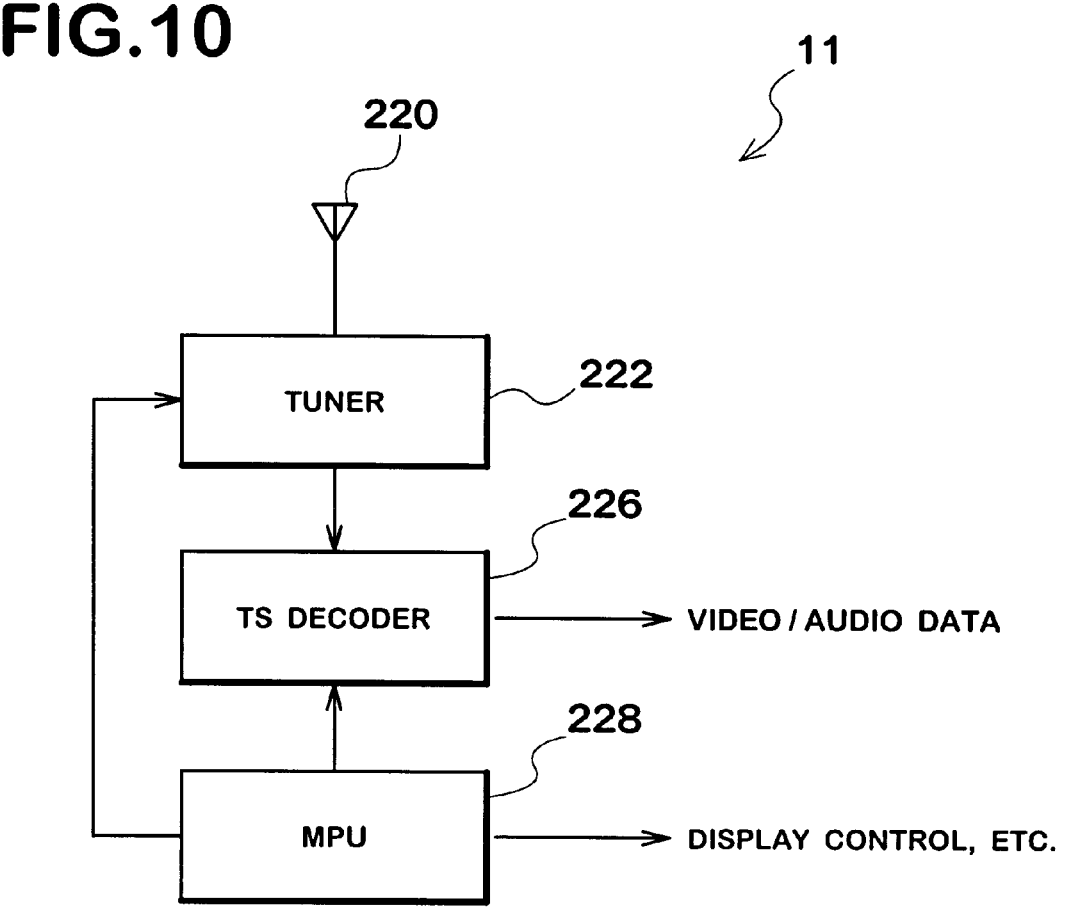
FIG. 10 is a general diagram of a receiver.

Using FIG. 10, a general description of the receiver 11 diagrammed in FIG. 1 is now given. In the receiver 11, one transport stream is selected from among the plurality of transport streams by a tuner 222, and data for a desired service are separated by a transport decoder (TS decoder) 226 from the transport stream given by the tuner 222.

An MPU 228 sets the packet ID for the video and audio data for the desired service in the TS decoder 226. Thus the TS decoder 226 outputs the video and audio data for that service. When a control data packet ID is set in the TS decoder 226, the separated control data are sent to the MPU 228.

Assuming now that the service 1033 in the transport stream 1030 is currently being received, the operation is now described for the case where an instruction to switch to the service 1012 in the transport stream 1010 is sent to the MPU 228.

The MPU 228 controls the TS decoder 226 (that is, sets the control data NIT packet ID), and fetches the NIT. By referring the NIT, it is known that the service 1012 for which reception is desired is being multiplexed in the transport stream 1010 (cf. FIG. 9). The MPU 228 controls the tuner 222, and receives the transport stream 1010. The MPU 228 controls the TS decoder 226, acquires the PAT and PMT 112, and acquires the packet IDs for the video data and audio data for the desired service 1012. The MPU 228 sets filtering conditions for selecting these packet IDs in the TS decoder 226, and causes the data for the desired service 1012 to be output from the TS decoder 226.

Switching the service received is done as described above.

When a command to display the program schedule or program information is sent to the MPU 228, the MPU 228 controls the TS decoder 226 and acquires the EIT. Based on that acquired EIT, control is effected so that the program information and so forth are displayed.

1-2. First Embodiment 1-2-1. Transmitting Unit

Figure 11:
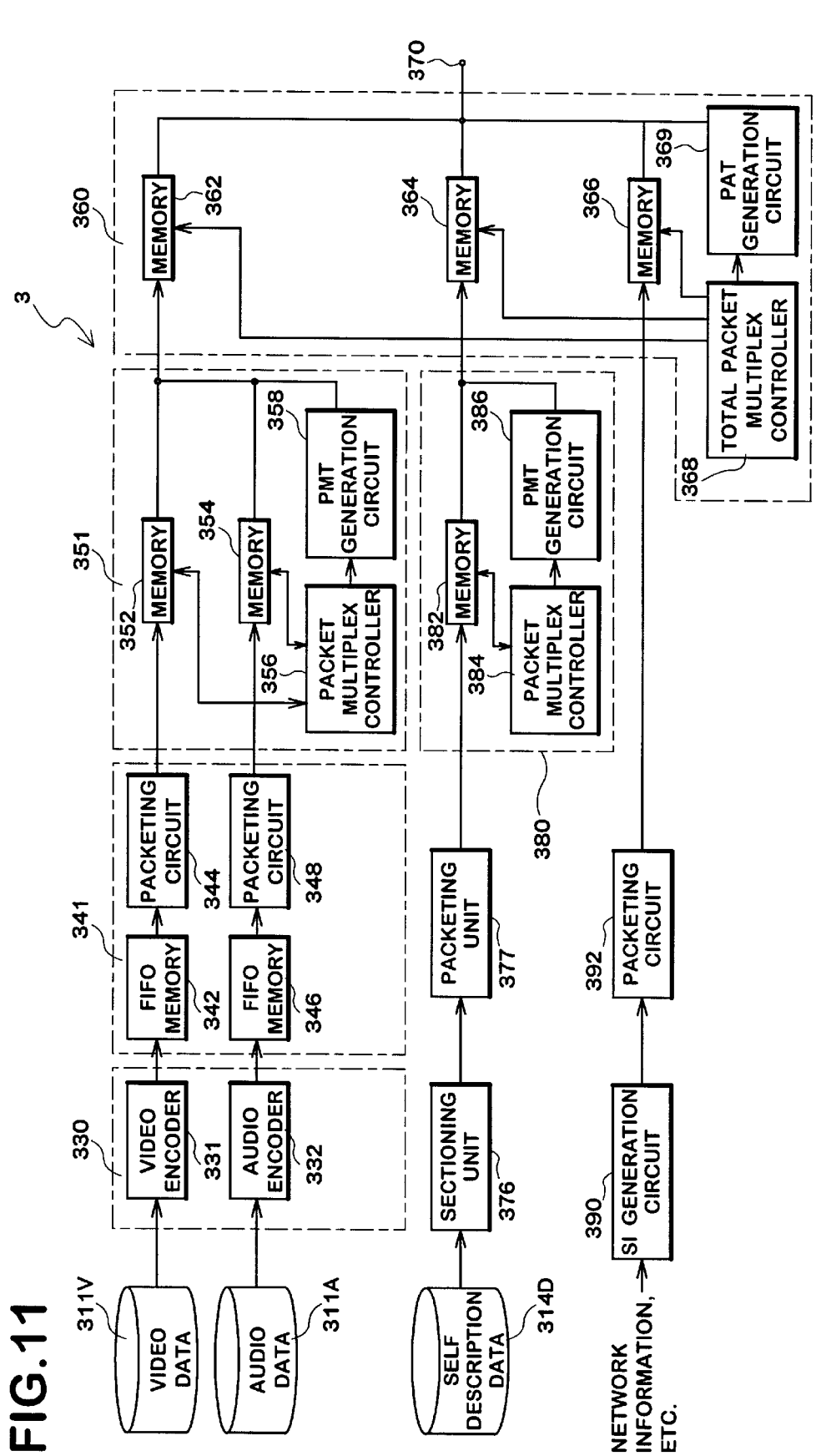
FIG. 11 a diagram of the hardware configuration of a transmitting unit.

In FIG. 11 is diagrammed an example hardware configuration for the transmitting unit 3 indicated in FIG. 3. The following descriptions are for applications to a digital broadcasting system based on the MPEG-2, DSM-CC, and DVB-SI standards. The MPEG-2 standard is set forth in ISO/IEC 13818-1 and ISO/IEC 13818-2. The DSM-CC standard is set forth in ISO/IEC 13818-6. And the DVB-SI standard is set forth in ETSI ETS 300 468 (ARIB STD-B2 version 1.0 in Japan).

The transmitting unit 3 is a satellite digital transmitting device that can transmit self-descriptive data multiplexed video data and audio data. The configurations of the services 1012 and 1013 are the same as that of the service 1011 and so are not further described here.

Video data for the service 1011 are stored in the video data memory unit 311V. These video data are encoded by a video encoder 331. The encoded video data are sent at a variable rate as an ES (elementary stream) to a FIFO memory 342 (first in first out memory). The FIFO memory 342 outputs the video data ES to the packeting circuit 344 at a constant rate.

The packeting circuit 344 partitions the video data ES into fixed length packets (packets having a length of 188 bytes, for example), and writes those as PESs (packeted ESs) to a memory 352. At that time, each PES is written with a packet identifier (PID) attached.

The audio data for the service 1011 are stored in an audio data memory unit 311A. These audio data, similarly as the video data, are encoded by an audio encoder 332 and sent to a FIFO memory 346. These data are then rendered into fixed length packets in a packeting circuit 348 and written with PIDs added to a memory 354.

A packet multiplex controller 356 reads out the PESs of the video data and audio data stored in the memories 352 and 354 according to the encoding speed. The PIDs added to the PESs of the video data and audio data are sent to a PMT generator circuit 358. The PMT generator circuit 358 receives those data and generates a control data PMT (program map table) 111. To the control data PMT 111 are written the PIDs added to the PESs of the video data and audio data of that service. The packet multiplex controller 356 time-division multiplexes the PESs of the video data and audio data read out and control data PMT therefor, and writes those to a memory 362.

In the manner described in the foregoing, time-division multiplexed data are generated for the video and audio data for the service 1011 and stored in the memory 362.

In a data memory unit 314D are stored multiple self-descriptive data files, image files, and script files, etc.

The processing done in a sectioning unit 376 is now described. The sectioning unit 376 divides the modules into sections called download data blocks (hereinafter abbreviated DDBS) according to the DSM-CC standard. In this embodiment, each file is assigned to one module. Accordingly, each file is made up of a plurality of DDBs according to the data volume thereof.

With the DSM-CC standard, each divided module is controlled by download info indication (hereinafter DII). The sectioning unit 376 generates DIIs, using information from when the modules were made into modules.

Figure 12:
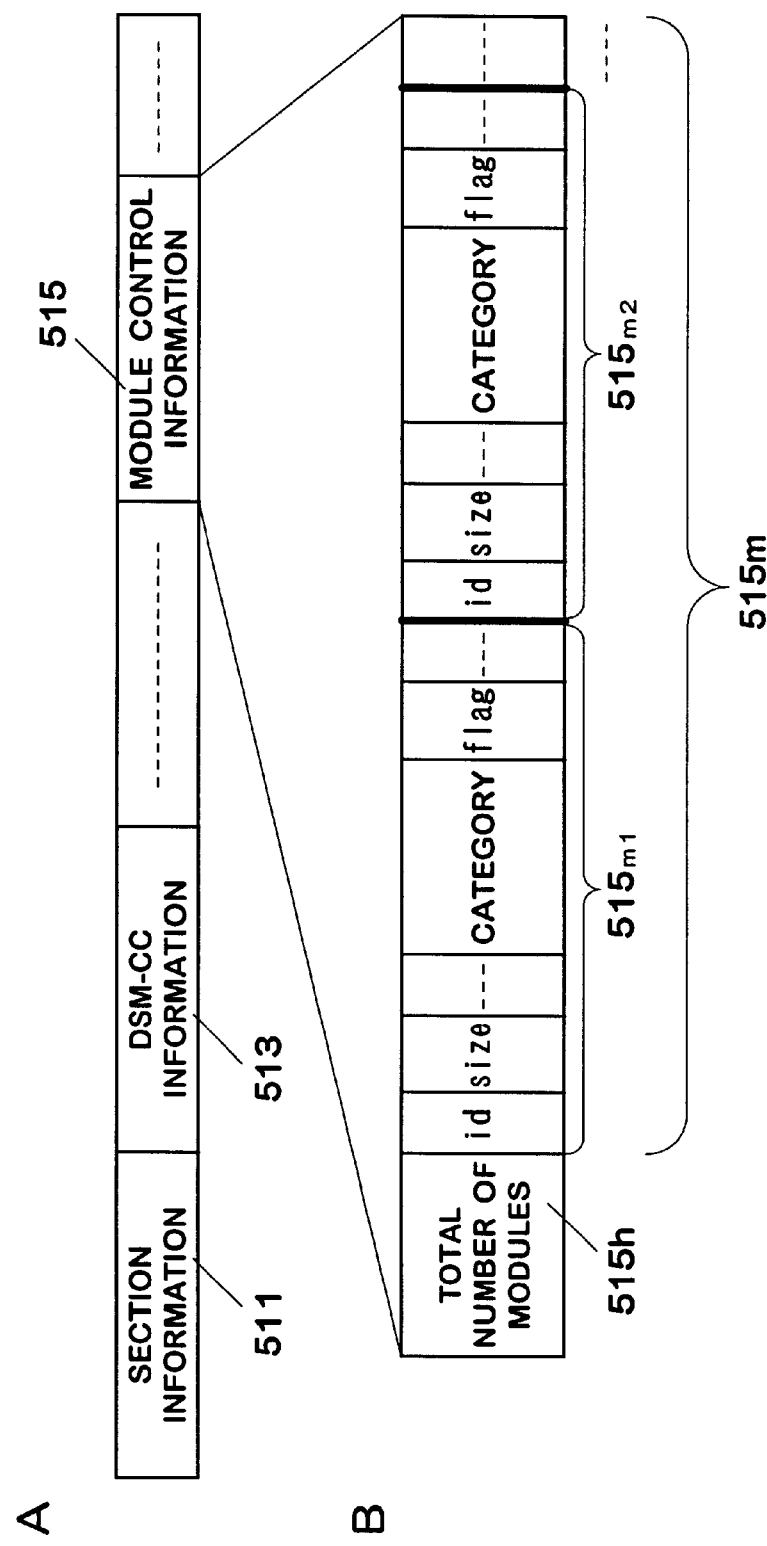
FIG. 12 is a diagram of DII data configuration.

The sectioning unit 376, for all of the modules controlled by one DII, reads out the total number thereof and the module size of each module, and stores those in a field 523 of D11(cf. FIG. 12).

The DII data structure is diagrammed in FIG. 12A. The DII comprises a section information field 511, a DSM-CC information field 513, and a module control information field 515. In the section information field 511 is stored information for specifying the DII, such, for example, as the table ID and table ID extension. In the DSM-CC information field 513 is stored DSM-CC information for displaying which event (program) each DII corresponds to, etc. In the module control information field 515 is stored module control information for actually controlling the modules.

The module control information field 515 is now described using FIG. 12B. The module control information field 515 comprises a module total number field 515*h* for storing the total number of modules, and an individual module information field 515*m* indicating control information for each module. In the individual module information field 515*m* is stored individual module information for the total number of modules. The individual module information contains, for each module, a module ID, module size, category ID, and pre-read disable flag, etc. In this case, for the 1st module, in the individual module information 515*m*1 are stored that module ID "0X0000, " module size "100 K bytes," category "0, " and pre-read disable flag "pre-read disable=1, " etc. The "OX" indicates that the numerals following it are in hexadecimal notation. Whether or not to use the category ID is discretionary.

One DII and the modules controlled by that DII are collectively called a group. The modules belonging to a group can be further subdivided into subgroups. Those subgroups are called categories. Which category is belonged to can be ascertained by the category ID mentioned earlier. Category IDs are stored as category information in a private field of the DII.

Figure 13:
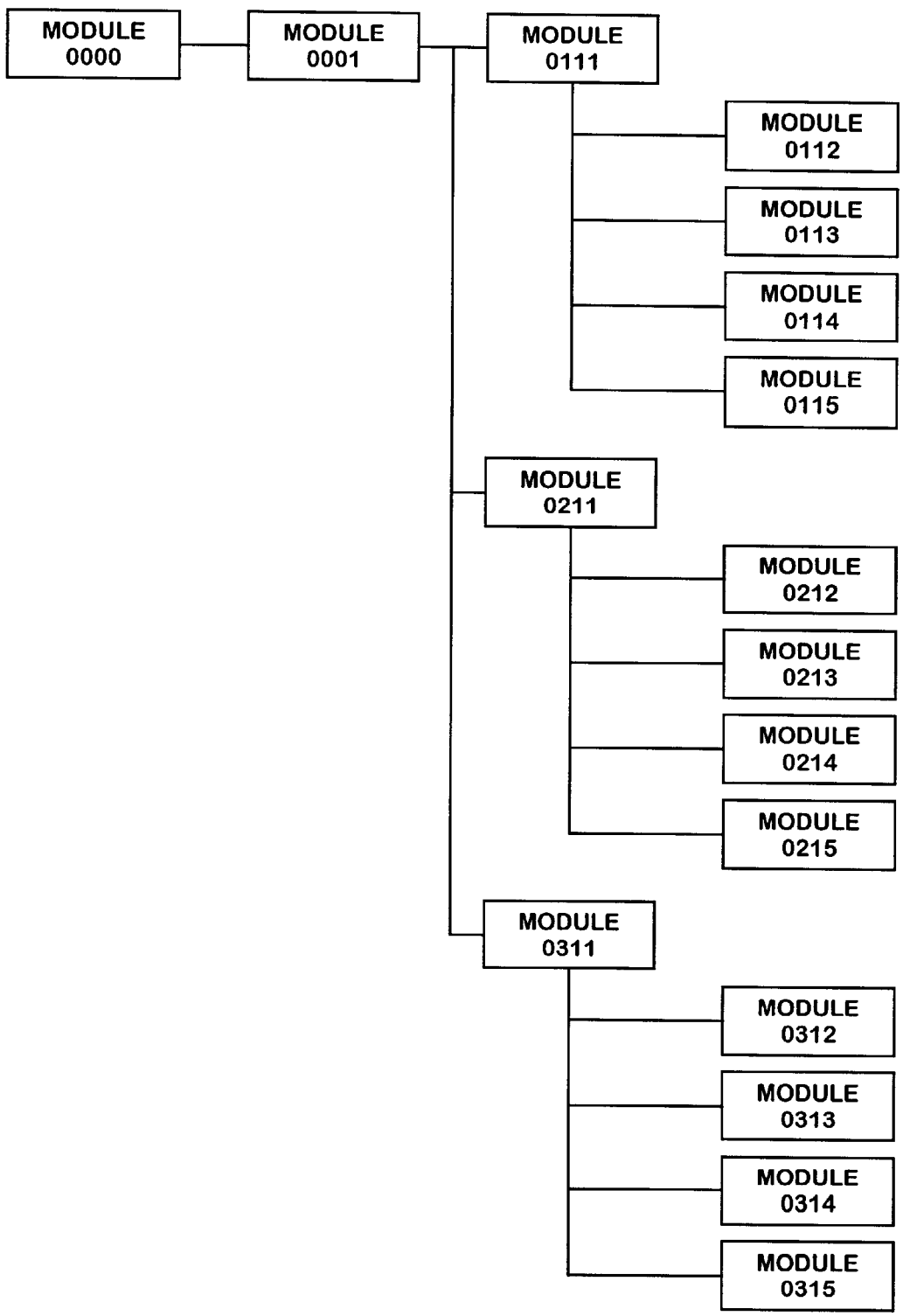
FIG. 13 is a diagram for describing the way modules are interrelated.

In this embodiment, moreover, the same category ID is applied to files belonging to the same subdirectory. For example, when one group of modules bears a link relationship such as is diagrammed in FIG. 13, the modules "0111" to "0115" are made one category. Similarly, the modules "0211" to "0215" and the modules "0311" to "0315, " respectively, are made single categories. The significance of these categories will be described subsequently.

In this manner, the sectioning unit 376 reads out the file size of each type of file in the data memory unit 314D and divides those data into sections. When performing this sectioning, moreover, a DII is generated. When performing this sectioning, furthermore, that module identifier is written to the section header. In each module header there exists a table field for setting the table ID and a table ID extension field for setting the table ID extension. In this embodiment, the module identifier for that module is stored in the table ID extension field.

The packeting unit 377 makes packets out of the section data generated by the sectioning unit 376. When one group of modules is being packeted, the same PID is attached. The PIDs for the groups can be referenced from a PMT that will be described subsequently. The reason therefor is that the PMT is a table that controls the PIDs which are the physical information that configures a program, and holds PID information for each group.

Next, the packet multiplex controller 384 indicated in FIG. 11 is described. The packet multiplex controller 384 reads out data stored in the memory 382 according to the encoding speed. The PIDs added to these data are sent to the PMT generator circuit 386.

The PMT generator circuit 386 receives those and generates the control data PMT 114 (cf. FIG. 4). In the control data PMT 114 is stored the PID for that service. The packet multiplex controller 384 multiplexes the data read out and the control data PMT therefore, time-division multiplexes those, and writes them to the memory 364.

The PMT generator circuit 386 also writes the module ID of the self-descriptive data file that configures the entry page first displayed by that service on the receiving end into added information field of the PMT.

A total packet multiplex controller 368 multiplexes the data stored in the memories 362, 364, and 366 by prescribed multiplexing rules. When that is being done, a PAT generator circuit 369 receives those and generates a control data PAT. These data are transmitted by a transmission circuit (not shown). That is, DIIs and DDBs are repeatedly transmitted, together with the video data, audio data, and various kinds of control data, in transport streams, in a carousel sending scheme.

1-2-2. Receiver 1-2-2-1. Hardware Configuration

Figure 14:
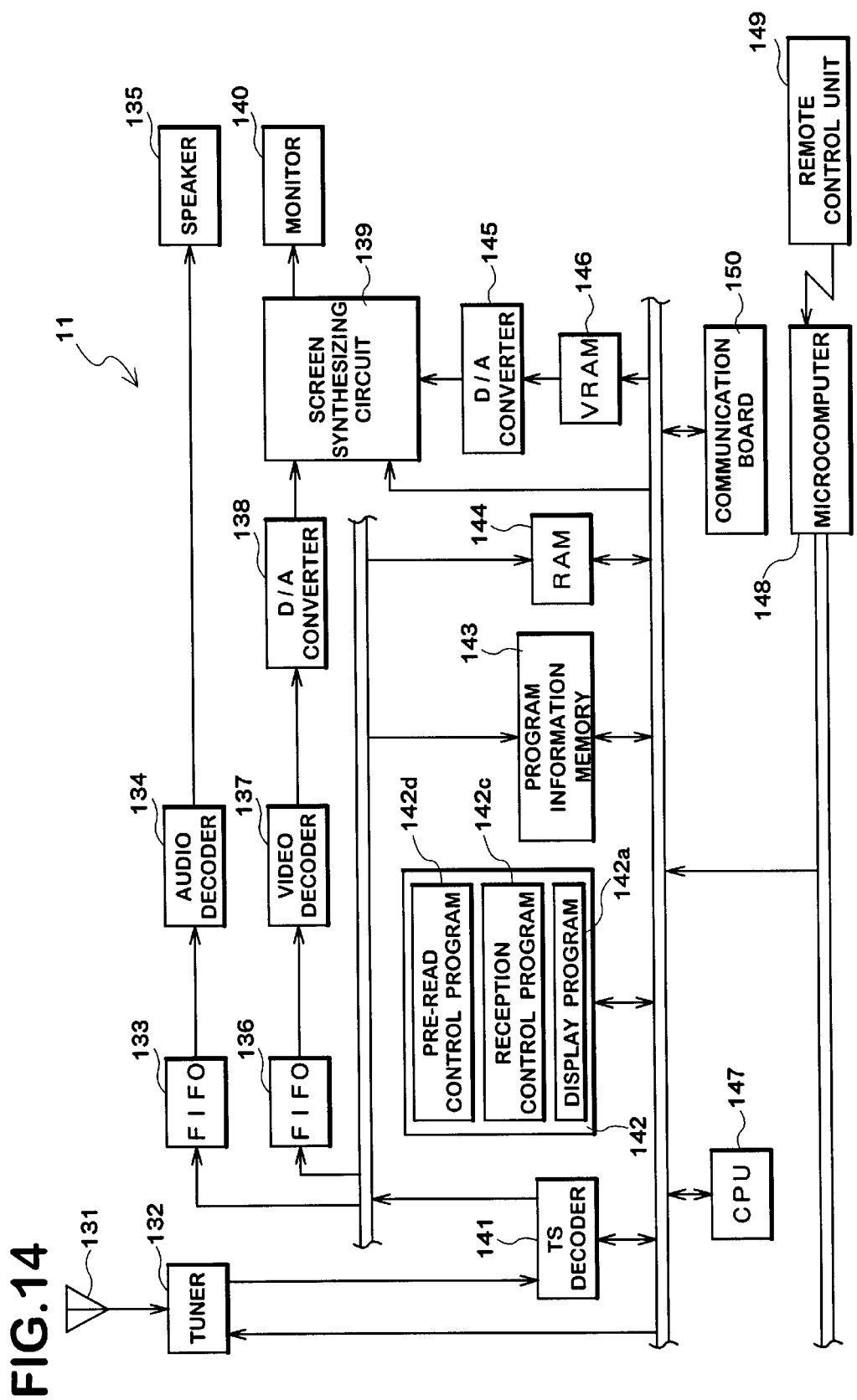
FIG. 14 is a diagram of the hardware configuration of a receiver.

In FIG. 14 is diagrammed the hardware configuration in a case where a CPU is employed to embody the receiver 11 indicated in FIG. 1. The receiver 11 has, in addition o the functions of an ordinary satellite broadcast receiver, functions for displaying self-descriptive data on a monitor.

The satellite broadcast data reception functions are the same as conventionally. Describing them simply, an antenna 131 captures electromagnetic signals from a transmitting unit and supplies those to a tuner 132. The tuner 132, following instructions from a CPU 147, selectively receives one transport stream. The tuner 132 also performs demodulation processing and error correction processing on the packets that are multiplexed in that transport stream, and outputs to a TS decoder 141.

The TS decoder 141 selects, from the section data sent from the tuner 132, only those section data which match the filtering conditions set by the CPU 147. In this embodiment, besides the video data and audio data, system data are multiplexed, wherefore, besides the control data, video data, and audio data, packets of system data such as self-descriptive data are also contained. The TS decoder 141 distinguishes between those, and stores the control data and system data in a RAM 144. When a number of sections are gathered to form one file, each file is stored in the RAM 144.

The TS decoder 141 selects packets on the basis of the filtering conditions that have been set, whereupon the video data are output to a video decoder 137, the audio data are output to an audio decoder 134, and section-format data packets are output to the CPU 147. These filtering conditions are modified by modification commands from the CPU 141.

The video data are sent via a FIFO memory 136 to the video decoder 137 and decompressed (expanded). The video data are converted to analog signals by a D/A converter 138 and, passed through a screen synthesizing circuit 139, and displayed on a monitor 140 such as a liquid crystal display or CRT. Text data written into a video RAM (VRAM) 146 are converted to analog signals by a D/A converter 145, and sent to the screen synthesizing circuit 139. Thus text and so forth can be displayed superimposed on the video images.

Audio data, meanwhile, are sent to the audio decoder 134 via a FIFO memory 133 and decompressed (expanded). The audio data are output as audio by a speaker 135.

A remote control unit 149 receives instructions from the viewer to begin viewing, designate the service, and search for program information categories, etc., and outputs those to a microcomputer 148 in the main receiver.

The CPU 147 controls the tuner 132 and TS decoder 141, etc., according to a display program 142a and a reception control program 142c stored in a ROM 142. These programs may be programs that either function independently or function presupposing the presence of an operating system (such as Microsoft Windows CE (TM)).

1-2-2-2. Reception Control Program

Figure 15:
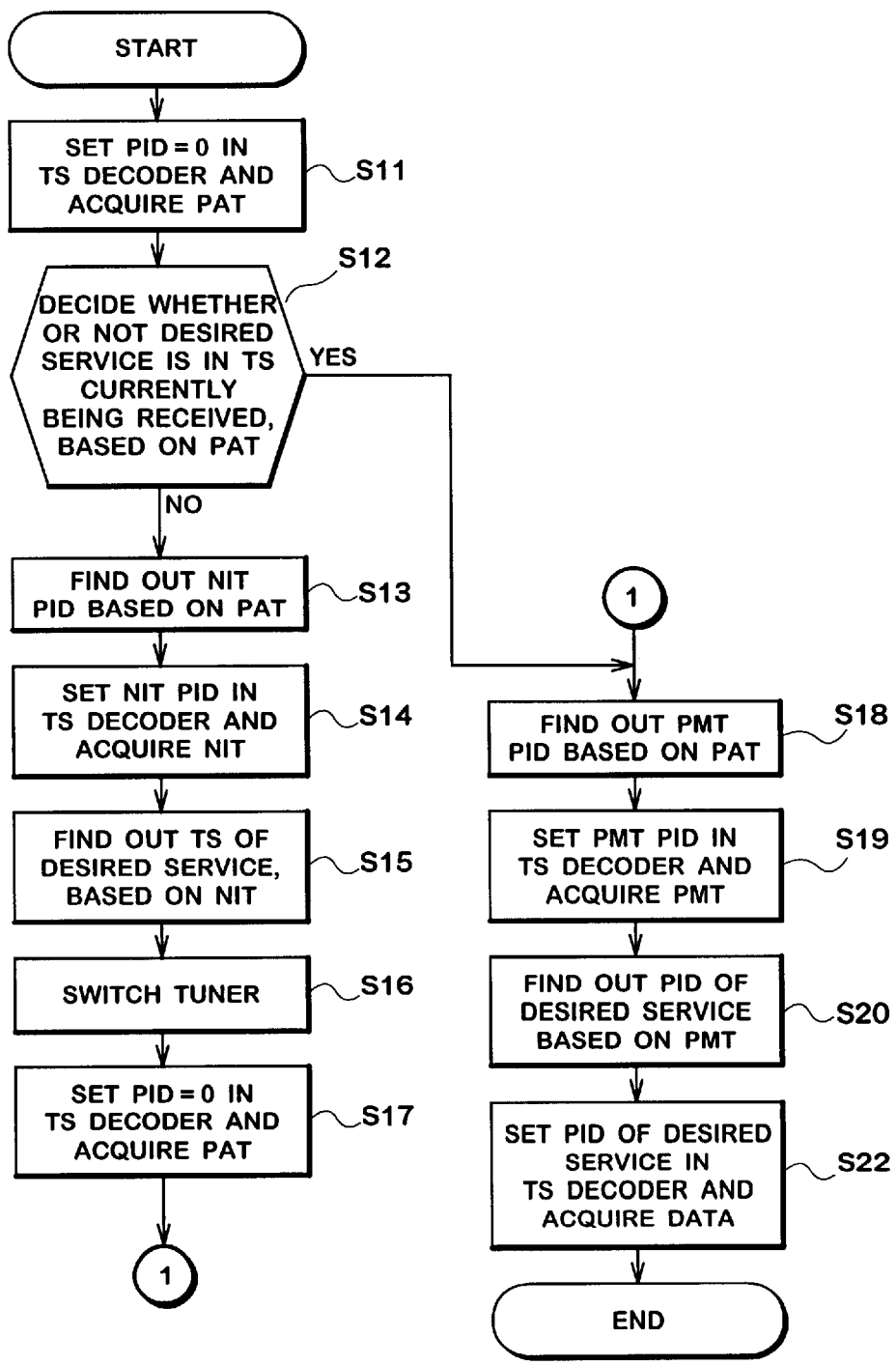
FIG. 15 is a flowchart for a reception control program.

The reception control program for performing such processing is now described using FIG. 15. The reception control program 142c is stored in the ROM 142. In the case described below, it is assumed that the service 1013 in the transport stream 1010 is currently being received, and that an instruction to switch to the service 1011 in the transport stream 1010 has been sent to the CPU 147. Instructions to the CPU 147 are sent from the remote control unit 149 indicated in FIG. 12 or from a control panel (not shown). These instructions are sent to the CPU 147 from the microcomputer 148.

When a service switching command is sent, the CPU 147 sets the PAT packet ID in a control data separation register (not shown) in the TS decoder 141. The PAT packet ID is fixedly determined as "0x0000." Thus the TS decoder 141 records the content of the separated PAT in the RAM 144 (step S11 in FIG. 15). In this PAT is written a list of the services being multiplexed in the transport stream 1010 currently being received (cf. FIG. 9). Accordingly, the CPU 147 learns that the service 1011 desired is multiplexed in the transport stream 1010 currently being received. That is, the CPU 147 advances the processing from step S12 to step S18.

The CPU 147, in step S18, acquires the PMT packet ID for the desired service 1011 based on the PAT stored in step S11. Thus, as diagrammed in FIG. 8, the PMT for the service 1011 is known to be the packet ID "0x0011." The CPU 147 sets the PMT packet ID "0x0011" in the control data separation register in the TS decoder 141 (step S19). Thus the PMT 111 for the service 1011 is separated and the content thereof is acquired by the RAM 144.

The CPU 147, based on the PMT 111 for the service 1011 diagrammed in FIG. 6, learns the packet IDs "0x0022" and "0x0024" for the video data 81V and the audio data 81A (step S20). The CPU 147 sets the packet IDs "0x0022" and "0x0024" for the video data 81V and the audio data 81A in a filtering condition memory unit (not shown) (step S22). Thus the TS decoder 141 only selects and outputs the video and audio data 81V and 81A that need to be acquired.

When in step S12 the CPU 147 determines that the desired service is not multiplexed in the transport stream currently being received, it advances to step S13. The CPU 147 acquires the NIT packet ID by referring to the PAT. The CPU 147, based thereon, acquires the NIT, and learns which transport stream the service desired is multiplexed in (steps 514, step S15).

The CPU 147 switches the settings in the tuner 34 so that that transport stream is received (step S16), and then acquires the PAT of the transport stream (step S17). After that, the routines in step S18 and following may be executed.

1-2-2-3. Display Program

The functions for displaying self-descriptive data on the monitor are realized by the display program 142*a* stored in the CPU 147 and the ROM 142.

The processing performed by the display program 142*a* is now described. First, the operator manipulates the remote control unit 149 by referring to the program list, so as to send a command to the CPU 147 to switch to a service that will receive an self-descriptive data file. The CPU 147 changes the selection conditions in the tuner 132 and TS decoder 141 when the command is received.

When, for example, the operator looks at the program list and finds that the service ID=001 for television shopping, he or she selects the service ID=001 using the remote control unit 149.

The PID of the PAT is the fixed value "0x0000," wherefore the CPU 147 switches the TS decoder filtering conditions to PID=0x0000 and acquires the PAT. When the service ID=001 is being multiplexed in a transport stream other than the transport stream currently being received, the NIT is acquired, and the PAT acquisition routine is performed after switching the tuner 132 so that the transport stream in which the service ID=001 is being multiplexed will be received.

When the PAT is known, the service PMT for the service ID=001 can be acquired. When the PMT is known, then the transport stream ID for the transport stream in which that service is being multiplexed, the PID of the packet(s) in which data related to that service are accommodated, and the module ID that will first be displayed will be known. Accordingly, the CPU 147, while switching the tuner 132, also modifies the filtering conditions for the TS decoder, and receives that service. Thus reception of the service for the service ID=1001 is begun.

Figure 17:
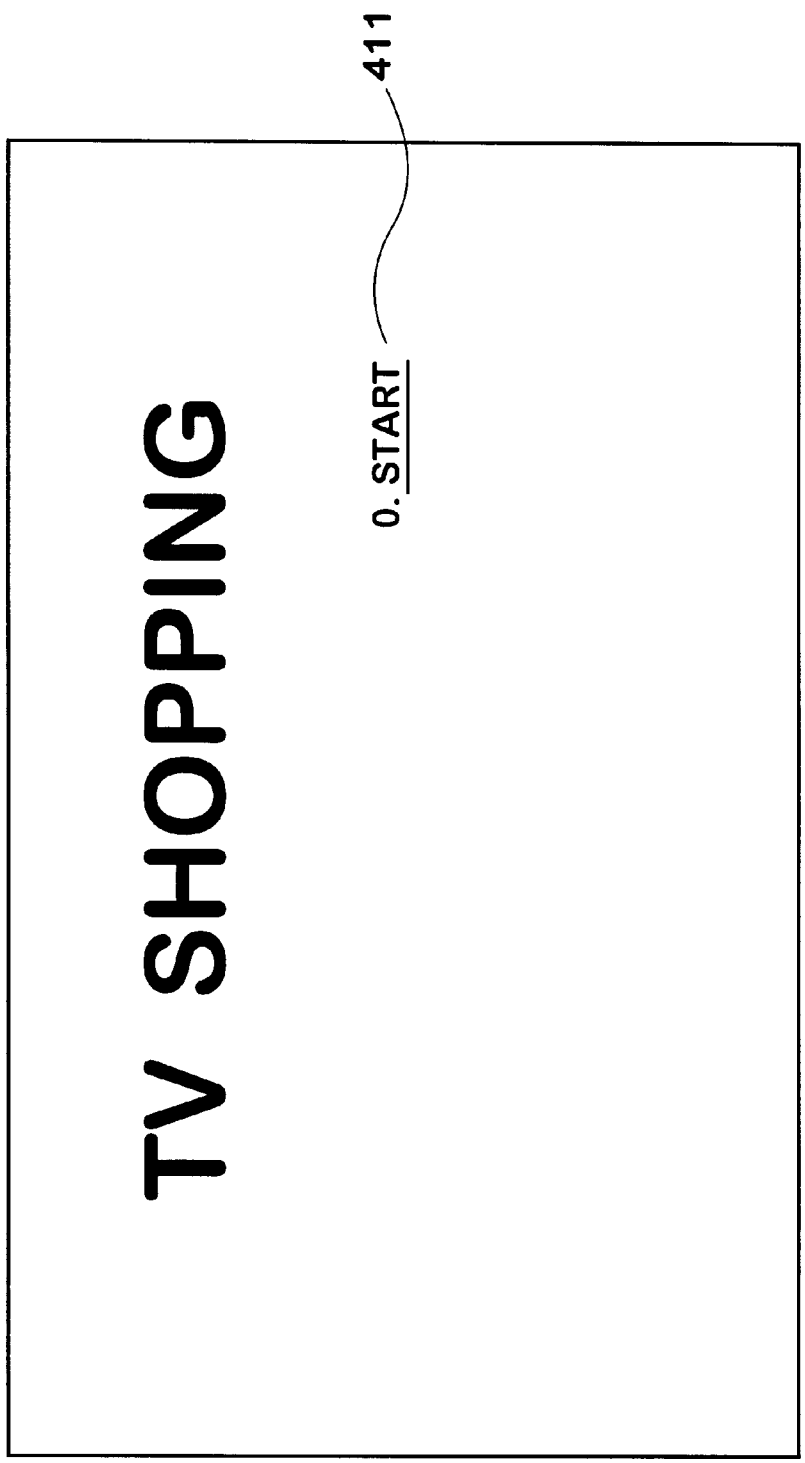
FIG. 17 is an example of a display displayed on a screen on the basis of the self-descriptive data represented in FIG. 16.

When the data acquired are data that are transmitted in a section format, the TS decoder 141 sends those to the CPU 147, and the CPU 147 stores those in the RAM 144. The CPU 147 also, based on the display program in the ROM 142, displays images on the monitor 140. In order to display a television shopping service, for example, when the self-descriptive data file given in FIG. 16 is received, an image such as that diagrammed in FIG. 17 is displayed. In FIG. 16, the program code enclosed between <info> and <info/> indicates the file name for that file. In this embodiment, the module ID is adopted as the file name, wherefore module 0000 is written enclosed between <info> and <info/>.

When the operator manipulates the remote control unit 149 (cf. FIG. 12) to select the button 411, the script 411s given in FIG. 16 is executed, and the filtering conditions for the TS decoder 141 are switched so that the module 0001 is selected. In this embodiment, provision is made so that the module ID is stored in the table ID extension field, and the table ID extension is changed from "0000" to "0001." Thus the data in the module 0001 given in FIG. 18 are output from the TS decoder 141. The CPU 147, based on those self-descriptive data, outputs the image represented in FIG. 19 to the monitor 140.

Figure 19:
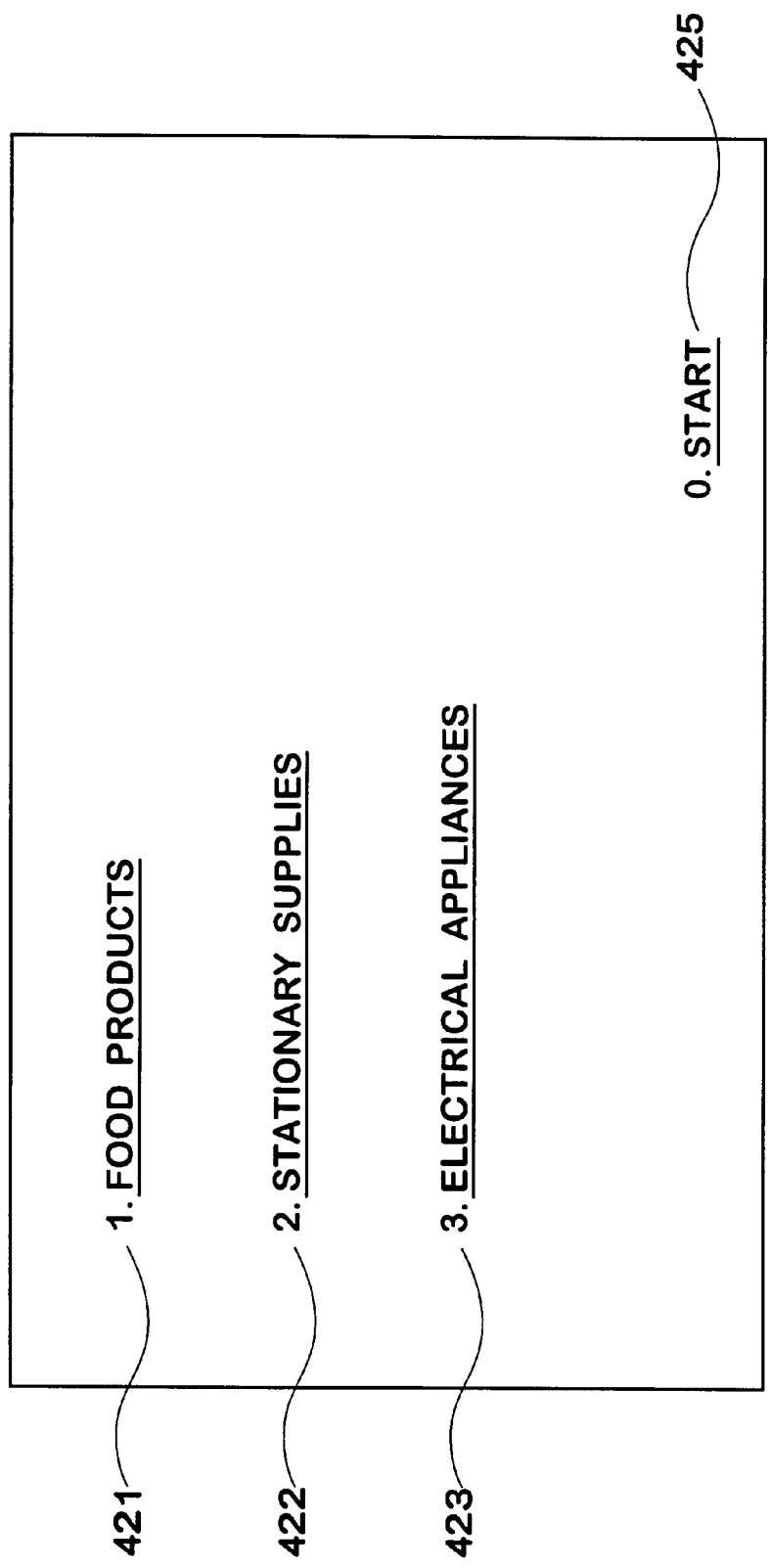
FIG. 19 is an example of a display displayed on a screen on the basis of the self-descriptive data represented in FIG. 18.

When the operator manipulates the remote control unit 149 (cf. FIG. 12) and selects the button 421, then the script 421s represented in FIG. 18 is executed, and the filtering conditions for the TS decoder 141 are switched so that the module 0111 will be selected. Thus the data in the module 0111 represented in FIG. 19 are output from the TS decoder 141. The CPU 147, based on those self-descriptive data, outputs an image like that given in FIG. 21 to the monitor 140.

When the operator manipulates the remote control unit 149 (cf. FIG. 12) and selects the button 431, then the script 431s represented in FIG. 20 is executed, and the filtering conditions for the TS decoder 141 are switched so that the module 0112 will be selected. Thus the data in the module 0112 are output from the TS decoder 141, and, based on these self-descriptive data, an image like that represented in FIG. 21 is output to the monitor 140.

Figure 21:
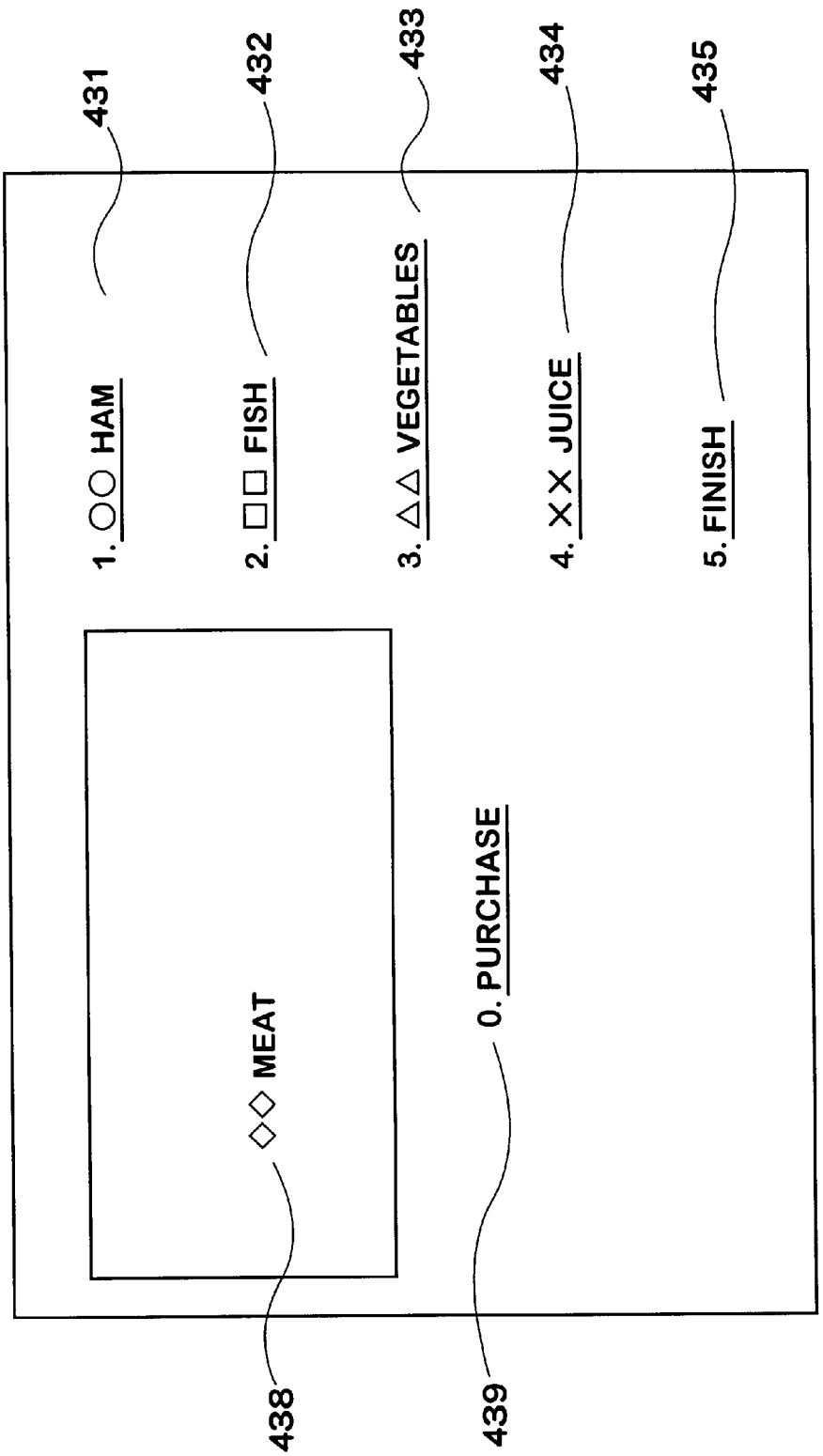
FIG. 21 is an example of a display displayed on a screen on the basis of the self-descriptive data represented in FIG. 20.

If, when the image indicated in FIG. 21 is being displayed, the operator selects the button 439, then the script 439S given in FIG. 20 is executed. That script 439s is a script for purchasing a product displayed in the field 438. The CPU 147, based on that script, transmits order information to a control center (not shown) via a communications board 150.

1-2-2-4. Pre-Reading Program

In this embodiment, provision is made so that empty area in the RAM 144 is used to perform pre-reading, by a pre-reading control program 142*d*.

Ordinarily, when pre-reading in the internet WWW, the HTML file of interest is read in, and a download request is made to an URL that is hyperlinked in the code of that file. In this embodiment, on the other hand, provision is made so that, instead of referencing the code contained in self-descriptive data in some module, the module to be pre-read is specified by a DII.

Figure 22:
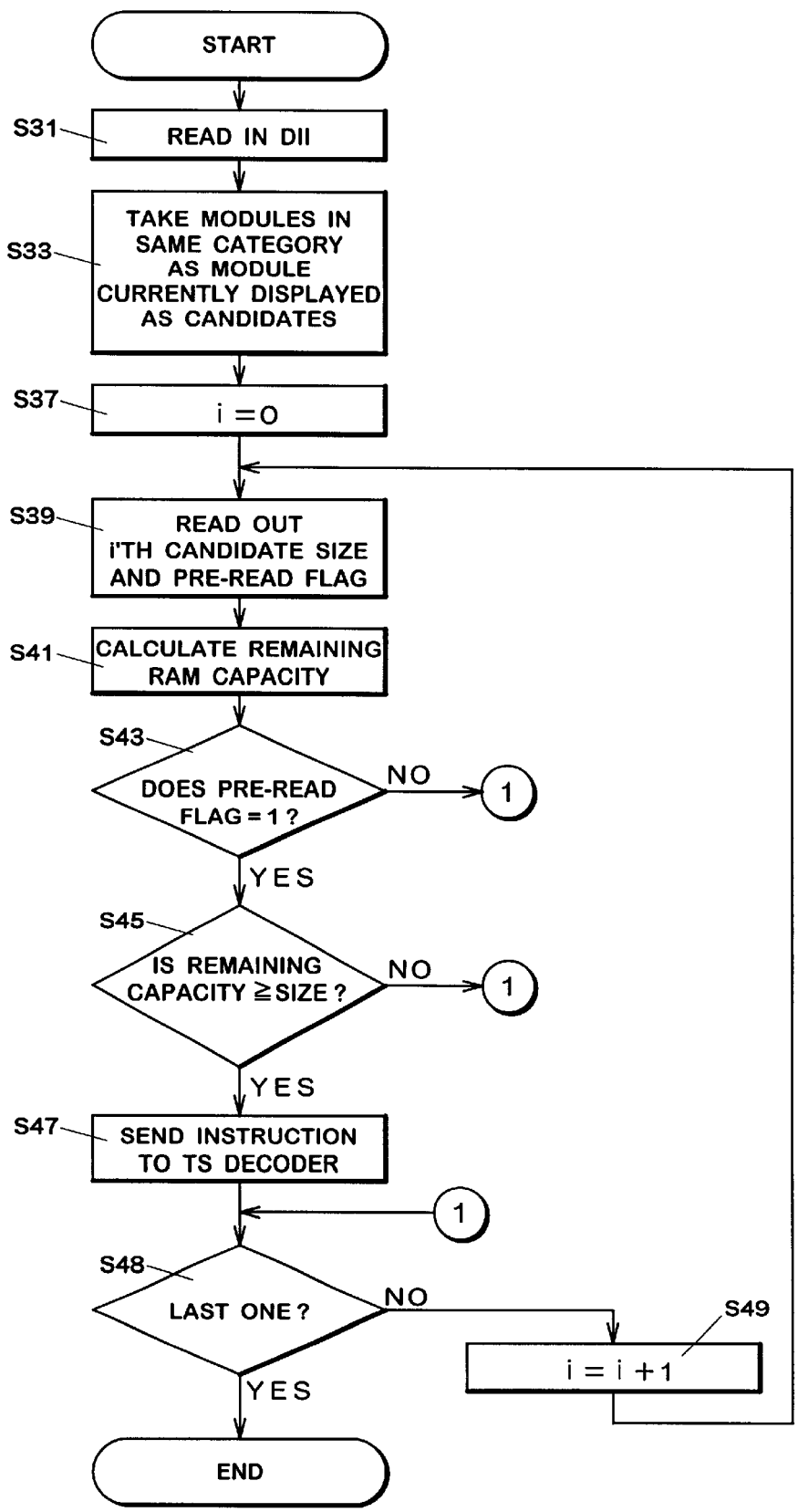
FIG. 22 is a flowchart for a pre-reading program.

The processing that is done by the pre-read control program 142*d* is now described using FIG. 22. The following description is for a case where the same category ID is imparted to the modules 0111 to 0115 diagrammed in FIG. 13, and the module 0111 is currently being displayed.

The CPU 147 reads the DII into the RAM 144 (step S31 in FIG. 22). More specifically, the CPU 147 references the PMT, acquires the PID for the DII, and sets the TS decoder filtering conditions. Thus the DII repeatedly transmitted in the carousel sending scheme as control information for the modules in the transport stream described earlier is received.

Examples of data in each module are represented in FIG. 23. In FIG. 23, data items that are to be referenced by the pre-read program are extracted from the module control information of the DII.

The CPU 147, referencing the DII described above, determines a module belonging to the same category as that of the module currently being displayed (step S33). Whether or not it belongs to the same category can be determined by referencing the category ID of the modules stored in the DII.

In this case, the module 0111 is currently being displayed, wherefore, by the step S33 indicated in FIG. 22, the modules 0112 to 0115 are taken as pre-read candidates.

The CPU 147 initializes the process number i (step S37), and, for the i-th pre-read candidate module, reads out the module size thereof and the pre-read flag (step S39). In this case, the module size "100k bytes" and the pre-read flag "1" for the module 0112 are read out. The CPU 147 calculates the remaining capacity (empty capacity) of the RAM (step S41).

The CPU 147 determines whether or not the pre-read flag for the candidate module read out in step S33 is on (=1) (step S43). In this case, the pre-read flag is on, wherefore the remaining capacity in the RAM 144 and the module size "100k bytes" for the module 0112 are compared (step S45). When the remaining capacity is larger than the module size of the candidate module, then a modification command to modify the filtering conditions is output to the TS decoder 141 so that that module will be selected (step S47).

When the remaining capacity calculated in step S41 is 550k bytes, for example, then the remaining capacity is larger than the module size (100k bytes) for the module 0112, so the filtering conditions are modified so that the module 0112 is pre-read.

The CPU 147 determines whether or not any pre-read candidate modules remain (step S48), and, when the final one has not been reached, the process number i is incremented (step S49), and the processing routines from step S39 on are repeated. Thus, by measuring the remaining capacity in memory area at the time that the decision is made as to whether or not to perform pre-reading, appropriate determinations can be made, even when the remaining capacity has changed due to the passage of time. Provision may also be made so that, instead of measuring the remaining capacity every time, once the measurement has been made, the capacity of the module pre-read is subtracted from that measured value.

When, in step S45, the remaining capacity is smaller than the module size of the pre-read candidate module, then only a portion can be pre-read, wherefore step S48 is advanced to without performing the routine in step S47.

Also, when the pre-read flag is not on in step S43, then it is determined that that is not a module which should be pre-read, and, similarly, step S48 is advanced to.

On the transmitting end, by transmitting modules that can be associated and read out on the receiving end with the same category ID imparted, pre-reading is done according to the memory capacity of the receiving terminal. Accordingly, it becomes possible to acquire data for that module in a shorter time, and, therefore, to display at high speed.

Thus, for associated modules, when there is enough empty capacity in RAM so that, comparing the remaining capacity in RAM memory at this point in time, the entire module at issue can be read into RAM, then, by setting filtering conditions in the TS decoder so that that module is pre-read, high-speed display is made possible when that module is necessary to the display. In particular, by making modules belonging to the same category associated modules as noted above, high-speed display is made possible for modules belonging to the same category.

Thus, associated modules are specified from the DII module control information, the data capacity of each module is acquired, and the modules to be pre-read are determined. When that is done, link destination files can be pre-read without referencing the program code in the self-descriptive data at issue.

Figure 24:
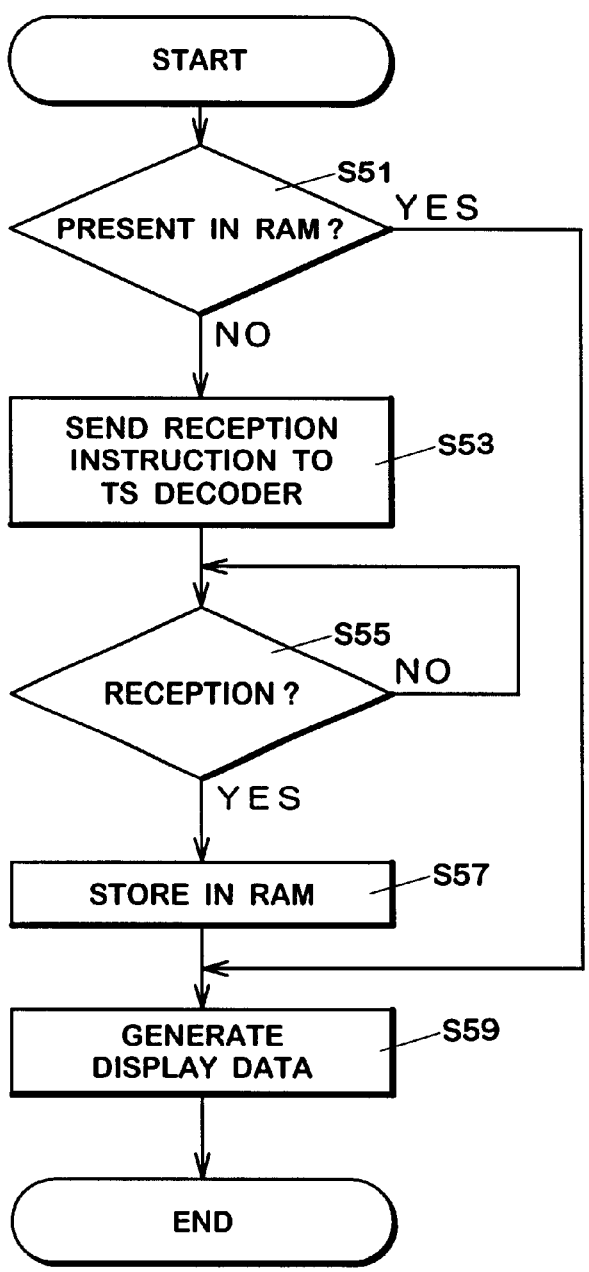
FIG. 24 is a flowchart for a display program when pre-reading is done.

The display processing when such pre-reading is done is now described using the flowchart in FIG. 24. The description which follows is for the processing that is done after the module IDs for the necessary modules have been specified. The CPU 147 first determines whether or not a module having a specified module ID is present in the RAM 144 (step S51). When the module having that specified module ID is present in the RAM 144, then step S59 is advanced to, the data in that module are read out from the RAM 144, display data are generated, and those data are output to the VRAM 146. When, on the other hand, the module with the specified module ID is not present in the RAM 144, then ordinary processing is performed. That is, the filtering conditions for acquiring the data in that module are passed to the TS decoder 141 (step S53), and, when the data in that module are sent from the TS decoder 141 (step S55), they are stored in the RAM 144 (step S57). These are then read out and display data are generated (step S59).

In this manner, in this embodiment, the CPU 147, upon determining that the data of some module are required, before setting the filtering conditions for acquiring the data in that module in the TS decoder 141, determines whether or not those data have been pre-read into the RAM 144. Thus high-speed display is made possible.

For modules that are transmitted after being multiplexed in the carousel sending scheme, moreover, there is virtually no benefit in pre-reading when only a portion of that module is pre-read. The reason for that is that, in order to read in the remaining portion, it is still necessary to read in the portion already stored in memory. In this embodiment, on the other hand, the size of each module and remaining memory capacity are compared, and that module is displayed when the module size is the smaller. Accordingly, pre-reading suitable to the carousel sending scheme is made possible.

Provision may also be made so that, for each module, a plurality of category IDs can be stored in memory. In this case, for example, the module 0111 is given the same category ID=1 as the modules 0112 to 0115. Then it is made possible to impart the same module ID=0 to that module 0111 as the modules 0211 and 0311. Thus, when the module currently being displayed is the module 0111, it is possible to pre-read modules for which it is possible that pre-reading them will be better.

The use of the pre-read flag is discretionary, but, by using such a pre-read flag, the benefits described below are realized. There are cases where not only are the same data in each module transmitted repeatedly, but those data are transmitted while being updated as time elapses. An example is the case where questionnaire results from viewers are broadcast in real time. In that case, displaying after pre-reading will result in the pre-updated content being displayed. In such cases as that, therefore, by removing those data from being subject to pre-reading by the pre-read flag, it is possible to receive the latest data without fail.

It is also permissible to store pre-read priorities for each module in the module control information. For example, even for modules belonging to the same category, one might, for example, set the pre-read priority of a module referenced in common by several modules high, such as in the case of a module configuring a verification screen after shopping has been completed, while, on the other hand, setting the pre-read priority low for modules which do not have a very high degree of association. For such pre-read priorities, a pre-read priority value may be set for each module.

Alternatively, such pre-read priorities may be stored in memory, as the level of connectedness between one file and another file, so that settings can be made between files. For the module 0111, for example, priorities may be stored in memory such that the level of connectedness with the module 0112 is 7, the level of connectedness with the module 0113 is 6, and the level of connectedness with the module 0122 is 1. Then, in that case, all that is necessary is to examine the remaining capacity for all modules subject to pre-reading beginning with those of greater connectedness level, and pre-reading only those which are smaller than the remaining capacity. The level of connectedness might be set high for an automatically referenced file that is automatically referenced irrespective of the control of an operator, for example. Such pre-read priorities may be determined only between the modules in the same category, but setting them between modules in different categories is also possible.

In such a case, instead of the processing routine in step S33 in FIG. 22, the levels of connectedness with the module currently being displayed for all of the modules are read out from the private field in the module control information, and arranged in the order of higher to lower. After that, the processing may be the same as from step S37 on.

It is also permissible to make provision so that, at the transmitting end, besides the DII, a table wherein are stored the levels of connectedness between such files is transmitted, and, on the receiving end, the modules to be pre-read are determined by referencing that table.

Provision may also be made so that the decision of whether or not to pre-read on a priority basis is made only for modules having large module size, greater than a prescribed size.

Also, memory release processing is performed according to prescribed rules for the RAM 144. Memory area is released at the stage where data for making a display are output to the VRAM 146, for example. When such memory area release is effected, the decision of which modules to pre-read may be made again (cf. FIG. 22). In that way, pre-reading that is linked to the release of memory is made possible.

In this embodiment, furthermore, provision is made so that modules to be pre-read are determined referencing only the DII. It is also permissible, however, to make provision so that limitation is made to modules used in a script, using the self-descriptive data in the module currently being displayed. When that is done, only the more necessary files can be pre-read. Or link destination modules in the self-descriptive data in the module currently being displayed may be made subject to pre-reading without referencing the DII.

In cases where modules subject to pre-reading not only have different filtering conditions in the TS decoder 141 but also different tuner selection conditions, provision may be made so that those selection conditions are modified.

In this embodiment, moreover, the module sizes are acquired from the DII module by module, and determinations are made as to whether or not to make those modules subject to pre-reading. However, that poses no limitation. It is also possible to use the total data volume of one group of a plurality of modules, decide whether or not the entirety of that group of modules can be pre-read in one operation, and perform such processing when such is possible.

For example, within the data broadcast identifier ($data_{13}$ $broadcast_{13}$ desc) in an EIT (event information table), a field exists, for each transaction, wherein the transaction ID and the total data volume are stored. That being so, it is possible to find that total data volume, and then determine whether or not to pre-read all of the modules belonging to that transaction ID in one operation.

Furthermore, although the case of using the EIT was described, when the grand total of the data volume pertaining to a plurality of related modules constitutes defined data, application can be made in the same way even when those are other data.

1-3. Other Embodiments

Provision may also be made so that, in cases where pre-reading cannot be done in transaction units referencing the EIT, decisions are made as to whether or not to pre-read in module units. In that case, in order to specify module IDs belonging to a transaction ID for which it has been determined that pre-reading cannot be done all at one time, provision may be made for comparing the transaction ID acquired from the DII with the transaction ID acquired from the EIT.

Furthermore, although the module size for each module of data is acquired from the DII, that may also be written in the DBB header information. In that case, provision may be made so that only the header portion of the module data is acquired first, without acquiring all the data in the module.

In this example, moreover, data accommodation determinations are made in module units, but they may also be made in group units.

Also, holding fags may be set up in the module control information, and the modules for which such holding flags are set held so that they will not be erased from the RAM 144. Thus a particular module can be compulsorily held, and the data in a pre-read module stored in memory without fail.

Such compulsory holding, moreover, may be released in cases where the level of connectedness with the module currently being displayed is below a certain value.

In the embodiment described in the foregoing, moreover, files are transmitted in DSM-CC object carousels and DSM-CC data carousels in MPEG-2 transport streams, but they may also be transmitted in other protocols that permit the same processing.

In the embodiment described in the foregoing, the descriptions are for cases where digital data transmission is performed by digital satellite broadcasting, but similar application is possible in ground-based digital broadcasts and line-based broadcasting such as cable television.

In the embodiment described in the foregoing, furthermore, provision is made so that the module ID for self-descriptive data files configuring the entry page first displayed in a service is imbedded in the PMT, but provision may be made so that it is a predetermined fixed value which is stored in a memory unit on the receiving end, whereupon, when an operator at the receiving end switches services, the table ID extension first received is set in that value.

Provision may also be made so that, when an self-descriptive data file configuring an entry page, as described above, is repeatedly received, it is compared against (an) other file(s) so that the transmission cycle is shortened. This is so that, since a given service cannot be entered when there is no self-descriptive data file configuring the entry page, that service can be entered without any time lag whatever.

In the embodiment described in the foregoing, moreover, provision is made for transferring self-descriptive data as different services for video data and audio data, but the transfer may be made within the same service, so that both are synthesized and displayed on the monitor.

Application can be made similarly for self-descriptive data that are SGML data, HTML data, XML data, or MHEG data, etc. For graphic data referenced by the self-descriptive data, moreover, formats other than the bitmap format (.bmp) or JPEG format (.Jpg) may be used, such as the GIF format (.gif).

In the embodiment described in the foregoing, the descriptions are for a case where the functions in the blocks diagrammed in FIG. 1 are realized with a CPU and other hardware, but there are no particular limitations on which functions are to be configured by hardware, and, furthermore, those portions configured by software may be configured by hardware logic, either in whole or in part.

In this embodiment, provision is made for storing the display program in ROM, but provision may be made so that it is stored in a storage medium such as an IC card or CD-ROM, and then transferred to and stored in a nonvolatile memory via an IC card drive or CD-ROM drive. Alternatively, such a program may be transferred by communications, and then stored in a nonvolatile memory.

That program can also be transmitted, using a transmission medium, as a computer data signal embodied in a carrier wave.

1-4. Previous Filing Disclosure

The present invention relates to the pre-reading of data after determining whether or not to perform data pre-reading at a receiving terminal for data that are carousel-sent in data broadcasting.

By data broadcasting is meant not only the broadcasting of ordinary video and audio (AV), but a broadcasting mode wherein additional information (such as a computer program or graphics) besides the video and audio is packeted in the same way and transmitted as a transport stream. A viewer can receive that packeted transport stream by a dedicated tuner (receiving terminal) in his or her possession, extract the additional information, and either execute it or reproduce it.

Ordinarily, broadcasting refers to a mode wherein information is sent in one direction from a broadcast station to receiving terminals. For this reason, when the data broadcast are acquired on the receiving terminal end, data cannot be acquired by the receiving terminal unless the data from the broadcast station are repeatedly sent again and again. The method of repeatedly sending that data is called carousel sending.

There are conventional data broadcasting systems wherein programs or executable data necessary to execute a program are transmitted as a transport stream from a broadcast station as a satellite signal or ground-based signal, and received by a receiver, whereupon the program or executable data are acquired from that transport stream, and the program is executed.

In this system, a program or executable data are carousel-sent from a broadcast station, and, on the receiving terminal end, when a program or executable data are required, those are acquired from the transport stream and the program is executed.

Here, in the case of a data broadcasting system wherein the receiving terminal does not have adequate memory, and it is very difficult to acquire the program at one time and execute it, data are divided beforehand into logical units (hereinafter called modules), and those modules are carousel-sent. Thus even a receiving terminal that does not have adequate memory can acquire just those data that are necessary each time from the transport stream and execute the program.

Furthermore, in this system, even when the receiving terminal does have adequate memory, the program execution can be performed so long as the data required for execution are acquired, so that there is no need to suspend execution until all of the information has been acquired. In other words, the system affords the benefit of making it possible to shorten the time required until the beginning of program execution.

Nevertheless, when the necessary module data are acquired every time, when the method of multiplexing the data involves making one carousel of all of the modules, the frequency with which the multiplexing is done decreases, making it difficult to acquire the necessary module data. Furthermore, when a number of modules are made into one group, and that group is carousel-sent, because the transmission band is usually fixed, each group carousel band diminishes, and the carousel period becomes large, making it difficult to acquire the required module data. Accordingly, much time is required to acquire the data in such cases, and there is a problem in that the processing of the entire program is not done smoothly.

In cases where the receiving terminal has enough memory to receive the data, data acquisition becomes unnecessary for the portions of data pre-read, when data pre-reading (caching) is performed, whereupon executing a program at high speed becomes a possibility. That is because, in general, reading data out of memory is done at higher speeds than the time required from the acquisition of data from a transport stream. Another reason is that, when a program is executed, until the need arises to acquire the next data, there will be wait time such as waiting for the user to make a key input, and data can be pre-read during that time.

Nevertheless, because module data are variable in length, there is no absolute certainty that acquired data will be stored in memory without fail, and there have been cases where, even though acquisition was started, all of the data could not be stored in memory, stored data could not be used when that data became necessary, or data that should have been stored could not be stored.

The present invention resolves the problems with the prior art noted in the foregoing, and thus an object thereof is to speed up the speed wherewith program execution, including data acquisition at the receiving terminal, can be performed.

In order to attain that object, the data broadcast receiving terminal of the present invention comprises a remaining memory calculating unit that calculates the memory area usable for data acquisition, a data size acquisition unit for acquiring data sizes, and a data acquisition decision unit that compares the data size acquired by the data size acquisition unit against the remaining memory calculated by the remaining memory calculation unit and decides whether or not to acquire the data. In the data acquisition decision unit, the data size acquired by the data size acquisition unit and the remaining memory calculated by the remaining memory calculation unit are compared, and a decision is made as to whether or not to acquire the data, whereby suitable data can be pre-read.

Also, a data broadcast receiving terminal relating to the present invention, comprising a pre-read information acquisition unit for acquiring pre-read information indicative of whether or not data pre-reading is possible, compares the data size acquired by the data size acquisition unit against the remaining memory calculated by the remaining memory calculation unit only when the pre-read information in the data acquisition decision unit allows pre-reading, and decides whether or not to acquire the data. In the data acquisition decision unit, the remaining memory and the data size, including information indicating whether or not pre-reading is possible sent from the broadcast station, are compared, a decision as to whether or not to acquire the data is made, and suitable data can be pre-read.

An embodiment of the present invention is now described making reference to the drawings. The description given here is for a case applied to digital satellite broadcasting. It is assumed that the digital broadcasting specifications are based on the MPEG2 standard, the DSM-CC standard, and the DVB-SI standard. These standards are described in the following documents.

| MPEG2 standard | ISO/IEC 13818-1 |
|---|---|
|  | ISO/IEC 13818-2 |
| DSM-CC standard | ISO/IEC 13818-6 |
| DVB-SI standard | ETSI ETS 300 468 |

In this example, a description is given of data broadcasting involving hyperlink data. An overview of data broadcasting, the hardware configuration, and program tuning in the receiving terminal are described in the specification and drawings in Japanese Patent Application No. H9-212937/1997.

In terms of receiver operation, the processing is described that follows the acquisition of a PMT wherein information is written indicating which stream (i.e. which PID) the video, audio, and data making up one program are being sent in. A description is given which uses a hyperlink type data broadcast program. The processing up to and including PMT acquisition uses a common method as the method of receiving digital satellite broadcast programs. For the details of this processing, one should refer to the specification and drawings in Japanese Patent Application No. H9-212937/1997, and to the DVB-SI and MPEG2 standards.

Data Broadcast Action Images

A hyperlink type data broadcast program outputs a video image on a display unit when the program is tuned in. Video images urging the user to make inputs are included in those video images. When the user follows those and makes inputs from a remote control or the like, the receiver receives the next video information linked to that input in accordance with that input, and displays that information. That is the program mode assumed.

A specific example is diagrammed in FIG. 25. In this example program, when the user tunes in this data broadcast program, the page diagrammed in FIG. 25A is displayed. With this page displayed, when the user selects the key 511 with the remote control, the page diagrammed in FIG. 25B is switched to. When from the screen in FIG. 25A the user selects the key 512 with the remote control, then the page diagrammed in FIG. 25C is switched to. The following description employs this program.

Data Structure Program Code

A data structure for realizing the data broadcast diagrammed in FIG. 25 is now described. In this case, the data structure comprises an ID information unit having an ID that specifies its own data, a video information unit having displayed video information such as diagrammed in FIG. 25, and an operation programming information unit wherein are programmed which actions are to be taken in response to user key inputs. The example programmed in FIG. 25 that was programmed with this data structure is represented in FIG. 26. The programming code enclosed by <info> and </info> is the ID information unit, wherein, in this example, the ID of the module displaying this page is written. The programming code enclosed between <graphic> and </graphic> is the video information unit, containing, in this example, the name and actual data for the image data diagrammed in FIG. 25. The programming code enclosed between <script> and </script> is the action programming information unit. In FIG. 26A are programmed the actions written in the FIG. 25A description. In this case, links to other module(s) are not made from FIGS. 25B and 25C as in FIGS. 26B and 26C.

In FIGS. 27 to 29 are given examples wherein the self-descriptive data represented in FIG. 26A are written as BML (broadcast markup language) data. In this example, three files (namely a BML document file "niko.bml," a PNG file "$1_{13}$ button.png," and a PNG file "$2_{13}$ button.png") are transmitted with one module id. The format wherein multiple files having data formats that differ in this manner are transmitted with one module is called a multipart format. In this case, three files are being transmitted as one module as the module 0000 for the component tag 0x40.

A simple description is now given concerning the program code for the BML document files represented in FIGS. 27 to 29. In line 1501, this is defined as a multipart format with each part partitioned by "boundary-sample." Line 1502 defines the original network id as "0004," the transport stream id as "0001," the service id as "0100," the event id as "0020," the component tag as "0x40," and the module id as "0000." In line 1503, the size of the module is defined as 23055 bytes. In lines 1504 are written reference data for referencing the parts divided into multiparts. In lines 1505 are defined the details of the part module configuring this part. Lines 1506 constitute a declaration that this is a BML document. In lines 1507, color and size settings are indicated for the object frame (the frame used when manipulating with the remote control).

In lines 1511 given in FIG. 28, settings are indicated for changing the color of frame when the focus is brought to bear on a button, indicating in this case that the color changes from index 8 to index 3. Lines 1512 contain the program code for the script tag. Therein are written code for switching to a display based on the file "sun.bml" transmitted with module 0001 for the component stage 0x40, or code for switching to a display based on the file "moon.bml" transmitted with the module 0002 for the component tag 0x40. Lines 1513 represent settings for the largest frame. Lines 1514 indicate position and size settings for the buttons 511 and 512 diagrammed in FIG. 25.

Lines 1521 given in FIG. 29 contain code for moving the focus position. The focus position is nav-index: 0 in the initial status, wherefore the id=tol frame is selected. That is, the focus is brought to bear on the button 511 diagrammed in FIG. 25. When clicked in this status, the GoTo1( ) in the lines 1512 is called, and a transition is made to a display based on sun.bml of the module ID "0x0001." When the right movement key (not shown) on the remote control is depressed, on the other hand, the focus position shifts to the button 512 diagrammed in FIG. 25. When clicked in this status, the GoTo2( ) in lines 1512 is called, and a transition is made to a display based on moon.bml of the module ID "0x002."

Lines 1522 and 1523 are PNG data for the buttons 511 and 512 diagrammed in FIG. 25.

In this embodiment, transmissions are made in a multipart format, but this may be a singlepart format (sending one file in one module).

Data Multiplexing and Sending Method

Now will be described how the data represented in FIG. 26 are multiplexed in a transport stream. In this example, the data represented in FIG. 26 are multiplexed in a transport stream using the data carousel structure of the DSM-CC standard. The data structures represented in FIG. 26 are controlled in units called modules. Each module is multiplexed by being divided into physical sizes in sections called DDBs (download data blocks). In the transport stream, modules are controlled by DII (download info indication). The structure of DII is diagrammed in FIG. 30. A DII has a field 521 for storing section information specifying the DII, a field 522 for storing DSM-CC information holding such information as which event (program) this DII corresponds to, and a field 523 for storing actually controlling module data such as which modules this program has. Attention is drawn here to module control. The field 523 has a number of modules field 525 indicating how many modules are held, and a field 526 for storing information relating to the modules. In the field 526 that is behind the number of modules field 525 are stored, for each module, a module ID (module ID) and module size (module Size) which is the size of the module, etc.

Figure 31:
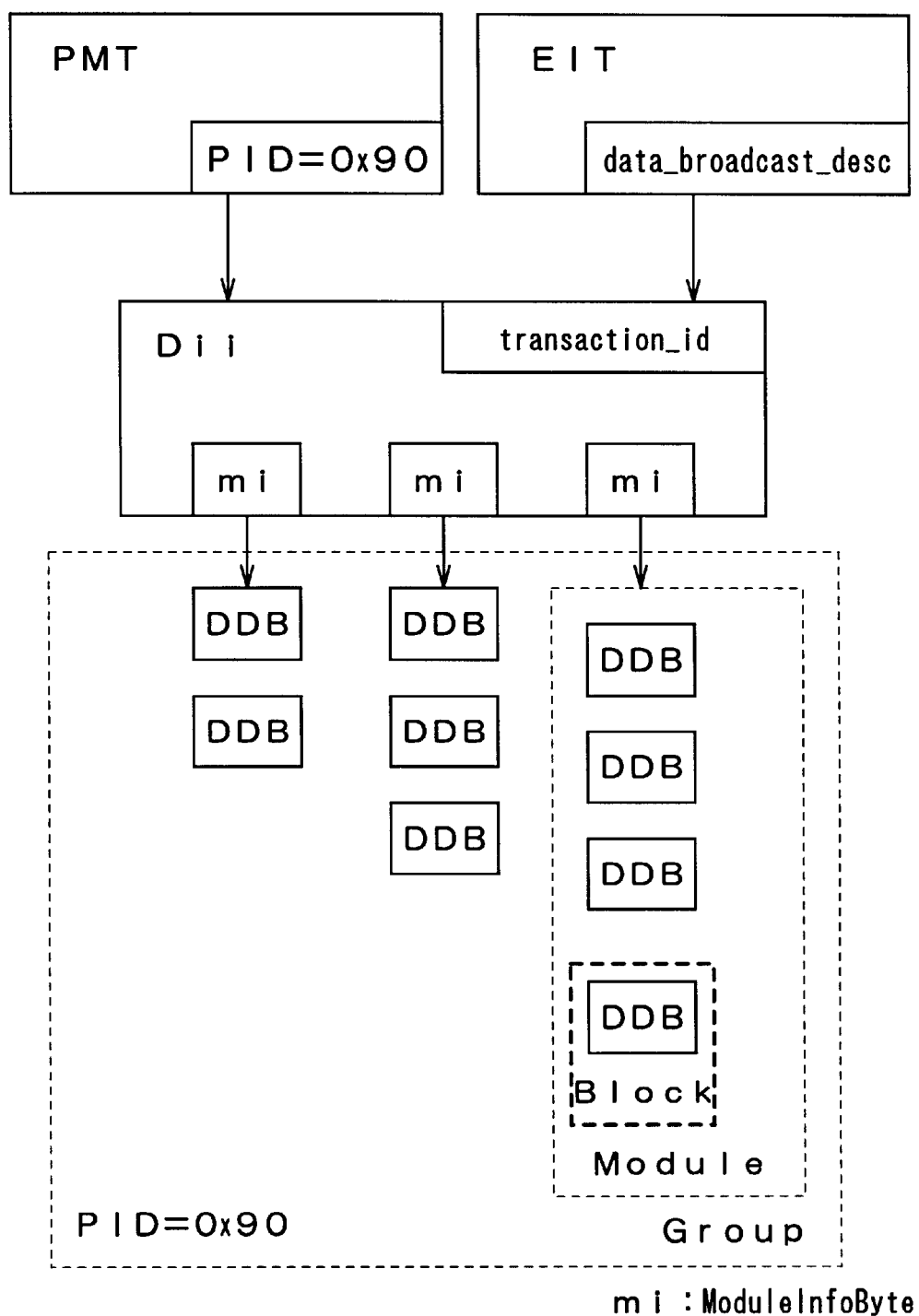
FIG. 31 is a diagram representing PMT, EIT, DII, and module referencing relationships.

The relationship between the DII described above and the module (DDB) is diagrammed in FIG. 31. As diagrammed in FIG. 31, the combination of the DII and the modules is called a group. This group is multiplexed in a transport stream with the same PID (packet ID). Also, as diagrammed in FIG. 31, there are two tables that specify this group, namely a PMT (program map table) and an EIT (event information table). The PMT controls the PIDs, which constitute the physical information that configures a program, wherefore the PMT holds group PID information, and can thereby reference the groups. The EIT holds program information, and in this data broadcast identifier (data_broadcast_desc) holds the transaction ID (transaction_id) inside the DII. Thus the EIT can reference groups. In this embodiment, the descriptions given use references from the PMT. The PMT and EIT are also described in detail in the MPEG2 and DVB-SI standards.

The group PID in this example is 0x90. Although the PID is made 0x90 here, it may be some other value. Also, the only PMT information noted here is the PID which indicates the data group, but that is not the only information held by the PMT. The details are set forth in the MPEG2 and DVB-SI standards. Here, moreover, there is one group in one program, but there may be a plurality of groups in one program.

Figure 32:
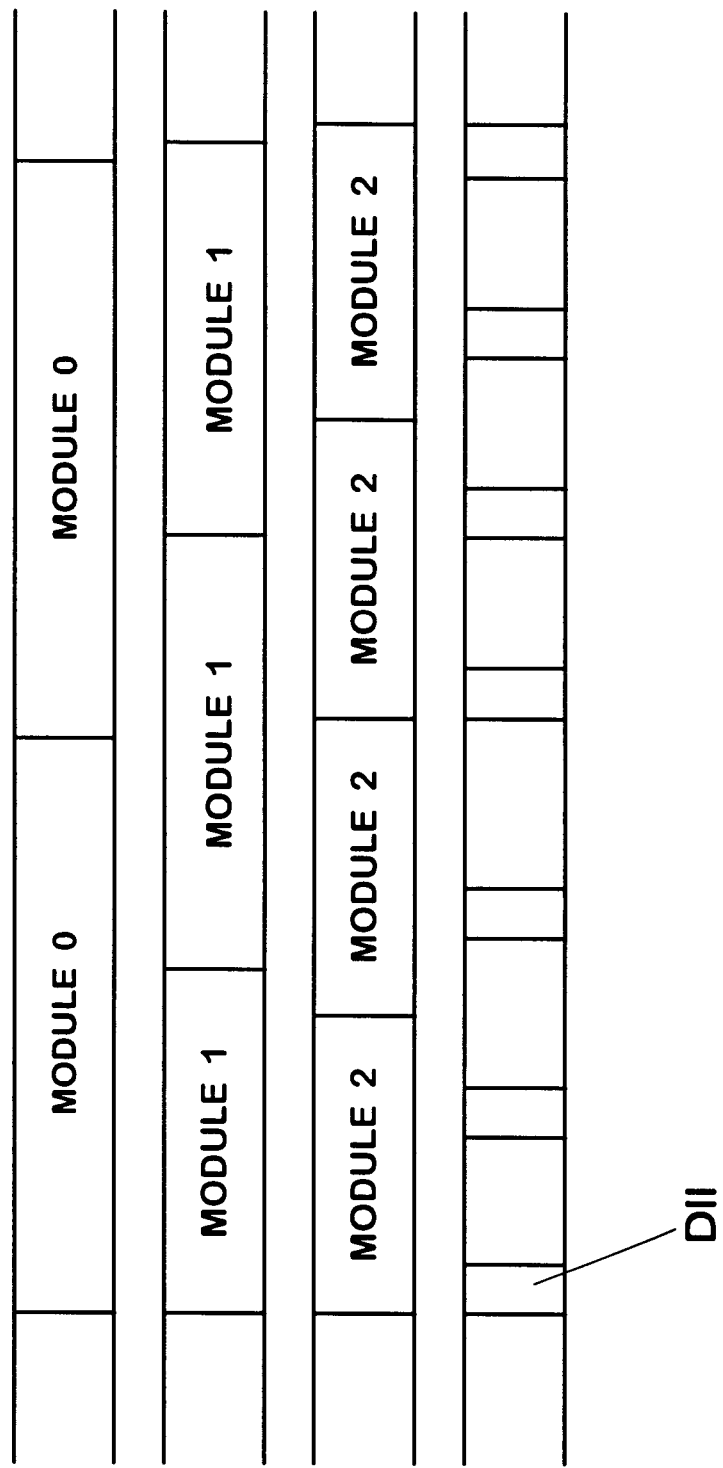
FIG. 32 represents an example of data multiplexing.

Next, a model diagram of how group data are multiplexed in a carousel scheme is given in FIG. 32. The respective sizes of the modules are as follows.

Figure 30:
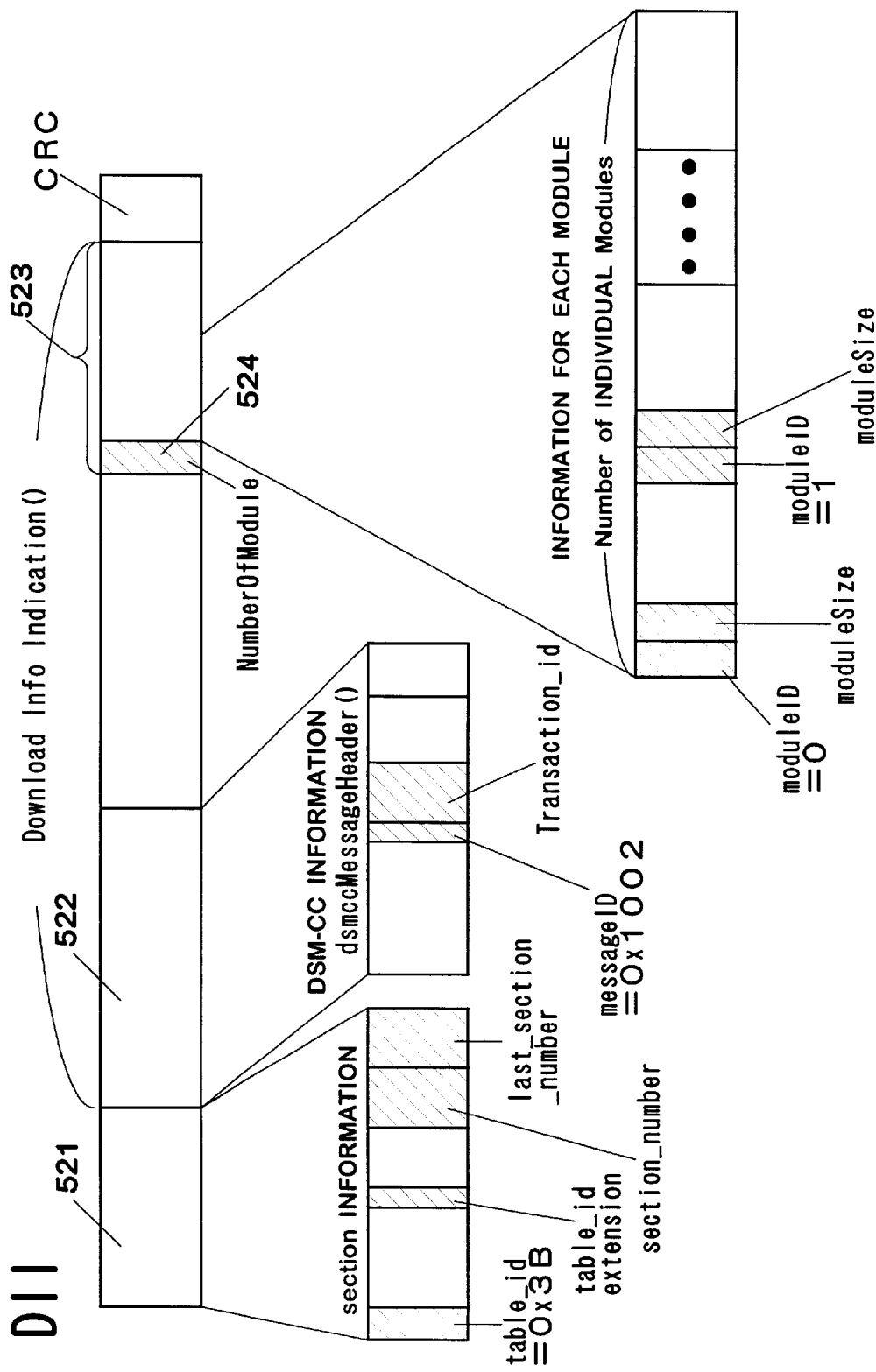
FIG. 30 is an example of data structure of DII.

Module 0 (moduleID=0): 100k bytes=102400 bytes
Module 1 (moduleID=1): 70k bytes=71680 bytes
Module 2 (moduleID=2): 50k bytes=51200 bytes Here, multiplexing is done with the module IDs made the same as the module IDs indicated in FIG. 30. It is further assumed that when the modules are actually multiplexed that the module IDs are also written into a part of the DDB header.

As diagrammed in FIG. 32, each module is multiplexed in a carousel. It is assumed that the DII is suitably multiplexed. In this embodiment, moreover, such carousel multiplexing as this is performed, but carousel multiplexing may be conducted by some other method (in a module order like 0, 1, 2, 0, 1, 2).

Configuration of the Data Broadcast Receiving Terminal

Figure 33:
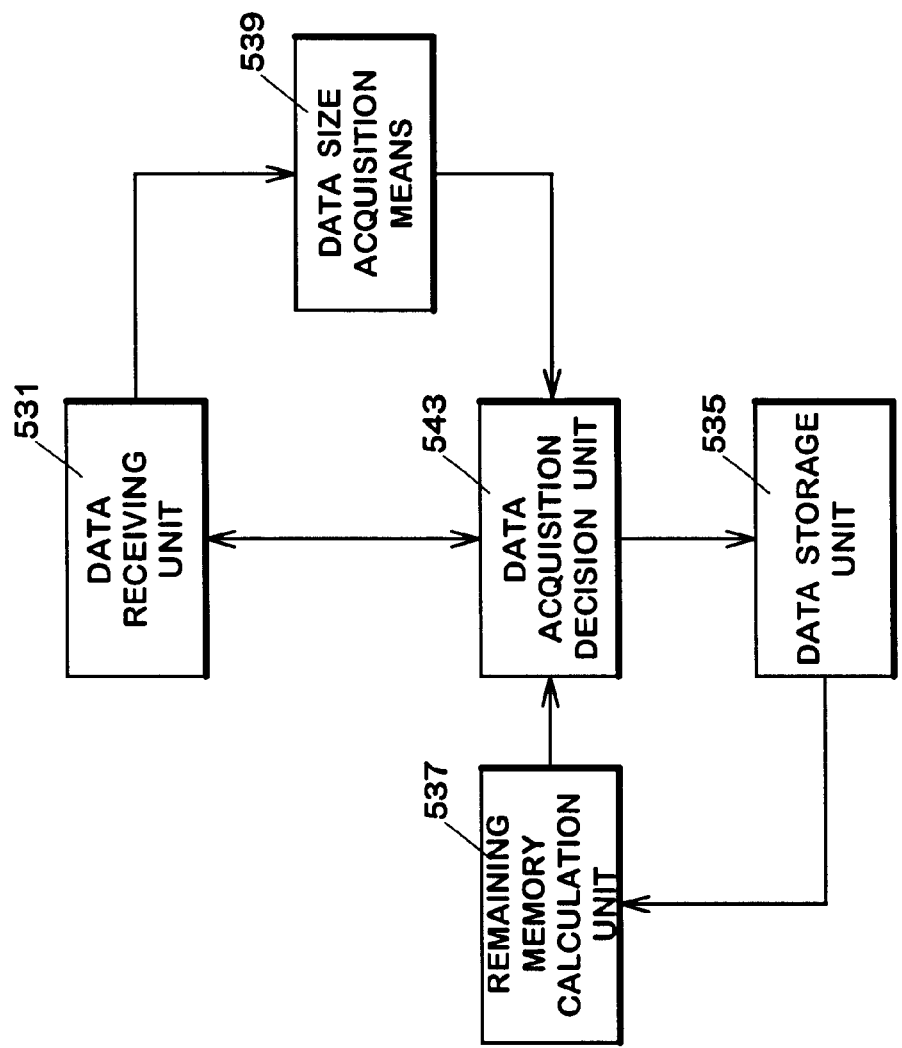
FIG. 33 is a block diagram in this embodiment.

The hardware configuration of the data broadcast receiving terminal handled here is a common hardware configuration such as that represented in the specification and drawings of Japanese Patent Application No. H9-212937/1997. Nevertheless, the configuration diagrammed in FIG. 33 is added.

A data receiver 531 extracts necessary data from the transport stream. The data receiver 531 also extracts data designated by a data acquisition decision unit 533. A data size acquisition unit 539 acquires the size of the data for which an acquisition decision should be made from the transport stream. A data storage unit 535 stores the data. A remaining memory calculation unit 537 calculates the area in the data storage unit wherein no data are stored. The data acquisition decision unit 533 compares the size of the data with the amount of remaining memory, decides whether or not the data can be accommodated in the storage unit, requests data reception from the data receiver 531, and causes the data to be stored in the data storage unit 535.

Operation During Tuning

When the user tunes in a data broadcast program, the program is specified by the transport stream ID (transport_stream_id), the service ID (service_id), and the event ID (event_id). The PMT which indicates the program configuration (components) is thus also specified. This program tuning is described in the DVB-SI standard. This PMT is diagrammed in FIG. 31. In this PMT is written the PID of the transport stream in which the data are flowing.

In the PID=0x90 written in the PMT in this embodiment, the data diagrammed in FIG. 32 are flowing.

Data Acquisition

As was described for tuning in the foregoing, the receiving terminal that receives the PMT obtains the PID of the DII. The DII is acquired from this PID, and therefrom the module ID and module size of each module are obtained. This is described specifically with reference to FIG. 26, FIG. 30, and the flowchart in FIG. 34. The size of the data storage unit at this time is assumed to be 150k bytes. In this embodiment, the data storage unit is made a memory area for acquiring only module information. It is assumed that memory for acquiring the DII and memory necessary for other execution are separately provided. In this embodiment, furthermore, the data storage unit is made an area for storing only module information, but that poses no limitation, and it may be made an area that includes DII acquisition, etc. The data storage area is made 150k bytes, but some other size may be used, and that size may even change dynamically while the receiver is being operated.

To begin with, the receiving terminal acquires the DII and obtains information for acquiring modules. The module for which the module ID=0 (cf. FIG. 26A) is acquired in order to acquire the first module. At this time, 100k bytes of data are stored in the data storage unit. The receiving terminal analyzes the data indicated in FIG. 16A, displays a video image, and waits for a key input from the user. At this time, the amount of remaining memory is calculated by the remaining memory calculation unit 537, and that is compared, by the data acquisition decision unit 533, with the size of modules other than the modules already acquired at that time. In this case, the module size=100k of the module having the module ID=0 is subtracted from the 150k size of the data storage unit 535 to obtain the remaining memory 50k. Next, that remaining memory is compared against the module size=70k for the module ID=1 referencing the DII. In this case, the module having the module ID=1 will not fit in the remaining memory, and therefore a decision is made not to acquire it.

The module size=50k for the module ID=2 is compared against the remaining memory. In this case, the module having the module ID=2 can be accommodated in the remaining memory, wherefore the module having the module ID=2 is acquired from the data receiver 531 and stored in the data storage unit 535. When here the user has depressed the button 512 (cf. FIG. 25) with the remote control, the receiving terminal will not acquire the module having the module ID=2 from the transport stream, but will first decide whether or not information for the module having the module ID=2 is present in the data storage unit 535, and, when it is present, will use the data for the module having the module ID=2 present in the data storage unit 535, and the receiving terminal will display the image besed on description written in FIG. 26B.

Conventionally, when acquiring the module ID=2, the data would have to be acquired once from the transport stream, requiring time for that acquisition. In this embodiment, however, such acquisition time is not required. Furthermore, since size determinations are made prior to acquiring data, the needless waste involved in acquiring other data after failing in a data acquisition is not incurred. Thus the operation of the data broadcast receiving terminal, inclusive of data acquisition, can be speeded up.

In this embodiment, the first module to be acquired was made module 0, but that module may be otherwise designated.

In this embodiment, moreover, the size of the modules is referenced from the DII, but it may be referenced from something else. Module sizes may be written into the EIT or PMT, for example. Or they may be written into the module header information. In that case, only part of the module header would be acquired instead of acquiring the entire module.

In this example, furthermore, data storage judgments are made using the module as a unit, but that may be done using the group as a unit.

Figure 36:
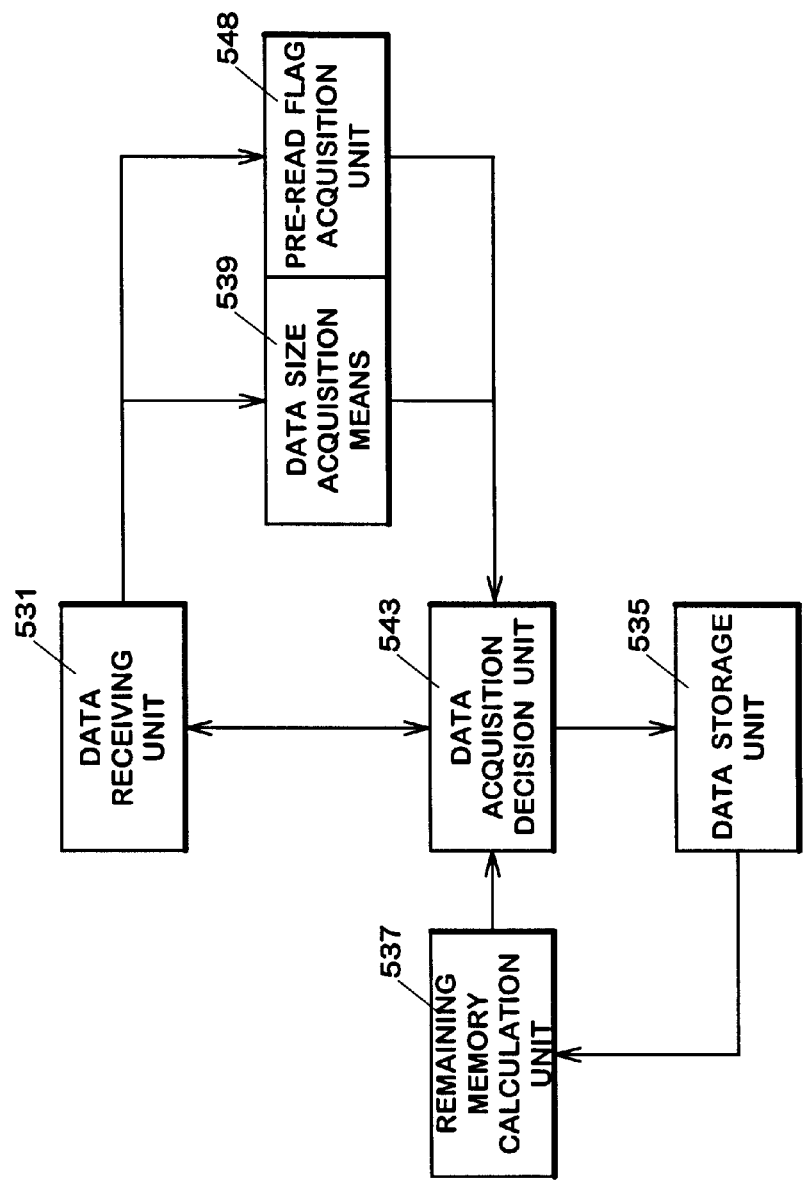
FIG. 36 is a block diagram in another embodiment.
Figure 37:
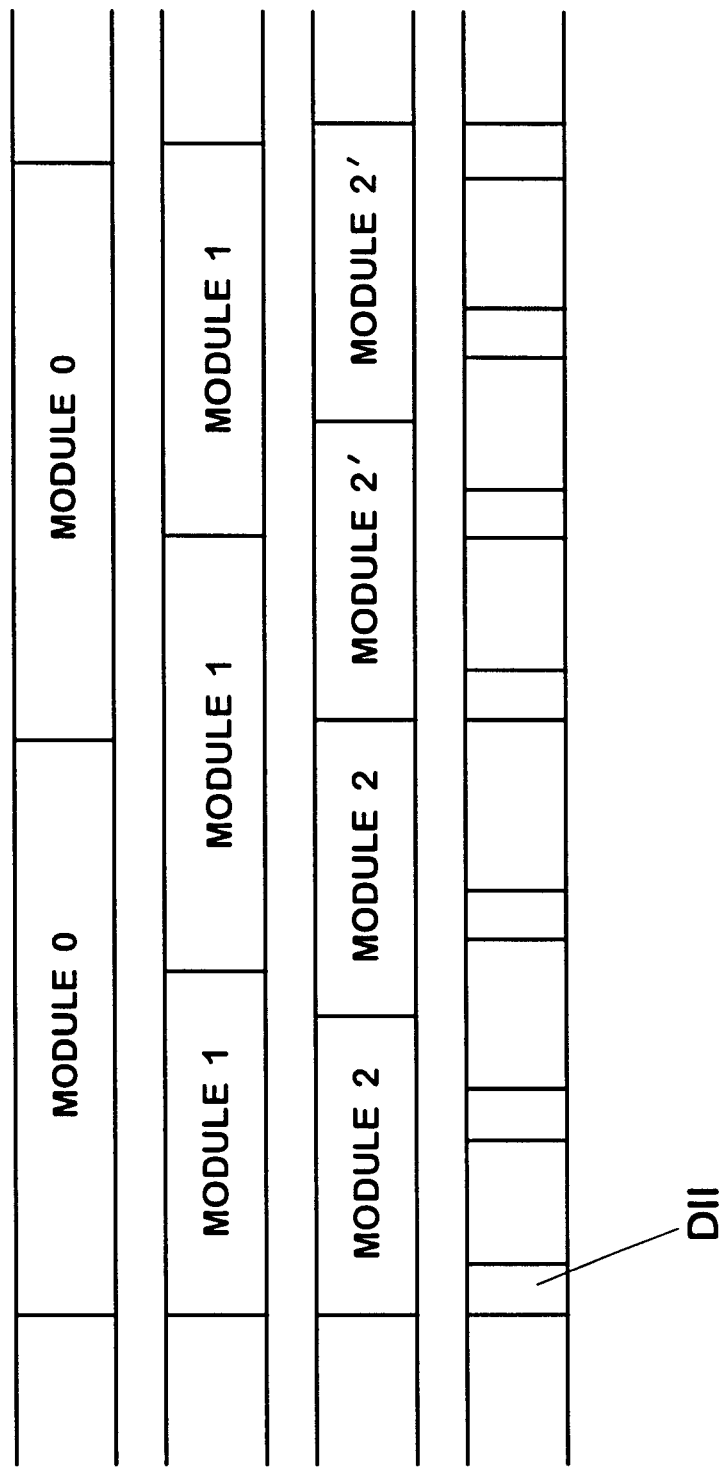
FIG. 37 is an example of data multiplexing in another embodiment.

Other embodiments are described making reference to the drawings. In FIG. 36 is given a functional block diagram of another embodiment of the present invention. In FIG. 36, the data receiver 531, data size acquisition unit 539, data storage unit 535, and remaining memory calculation unit 537 are configured in the same way as in FIG. 33. What differs from the configuration in FIG. 33 is that a pre-read flag acquisition unit 538 has been added and that a pre-read flag determination has been added to the data acquisition determination in the data acquisition decision unit 543.

The operation of the embodiment configured as noted above is now described.

Data Broadcast Action Images

The data broadcast programs handled in this embodiment are almost the same as in the example already described. However, what is different is that the video image for the page in FIG. 25C can be modified over time. That is, the data in FIG. 25C become data that it is better not to pre-read. This program is used in the description which follows. The data of the module 2 is modified one of the module 2' over time.

Data Structure Programming

The data structures in this embodiment are almost the same as in the example already described. However, what is different is that the moon.bmp data enclosed within <graphic> and </graphic> in FIG. 26C are data that are modified over time.

Data Multiplexing and Sending Method

Figure 35:
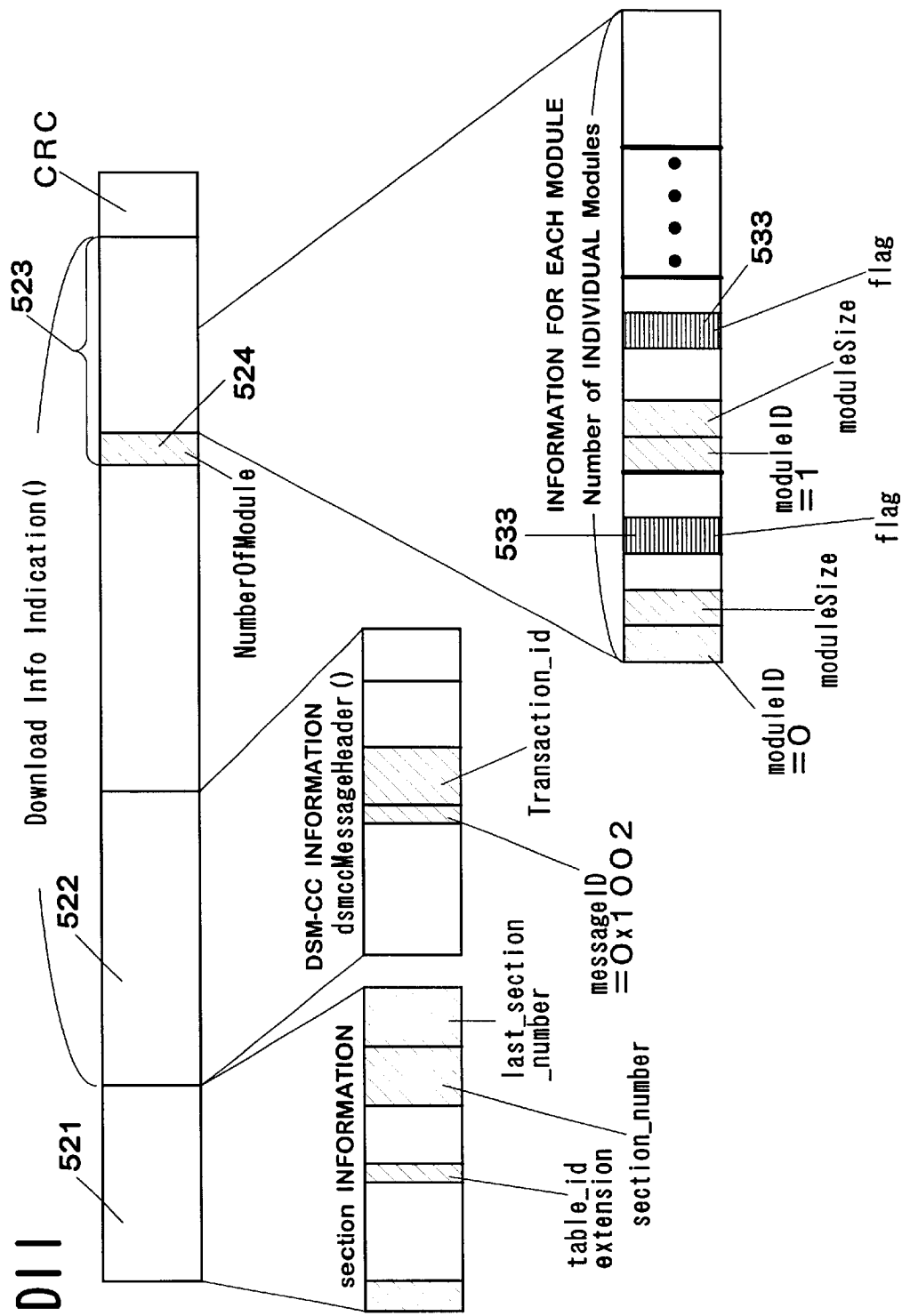
FIG. 35 is an example of data structure of DII in this embodiment.

In order to implement this embodiment, a field 533 for storing the pre-read flag is added to the field 523 in the DII diagrammed in FIG. 30 (cf. FIG. 35). Thus, in this embodiment, the pre-read flag is set in the field 523 holding information for the modules just as the module size.

The pre-read flag is information indicating whether or not module data should be pre-read by the receiving terminal. Modules for which this flag is set are not subjected to pre-reading by the receiving terminal. One example wherein this flag would be set is the case described earlier where data are renewed over time (when new versions are being issued).

The flag field is set in each module as follows in this embodiment.

Module 0 (moduleID=0): pre-read enabled (set to 1)
Module 1 (moduleID=1): pre-read enabled (set to 1)
Module 2 (moduleID=2): pre-read disabled (set to 0)

Receiving Terminal Configuration

The hardware configuration of the data broadcast receiving terminal handled in this embodiment is almost the same as in the example already described. However, the points of difference from the configuration diagrammed in FIG. 33 are the addition of a pre-read flag acquisition unit 548, and the addition of pre-read flag determination to the data acquisition determination in the data acquisition decision unit 543.

The pre-read flag acquisition unit 548 acquires the pre-read flag for the data for which an acquisition determination should be made from the transport stream.

The data acquisition decision unit 543 compares the size of the data with the amount of remaining memory, decides whether or not that data can be accommodated in the data storage unit 535, and, when the pre-read flag indicates that pre-reading is enabled, makes a request for data reception from the data receiver 531, and causes the data to be stored in the data storage unit 535. The operation during tuning has already been described and so is not further described here.

Data Acquisition

Figure 38:
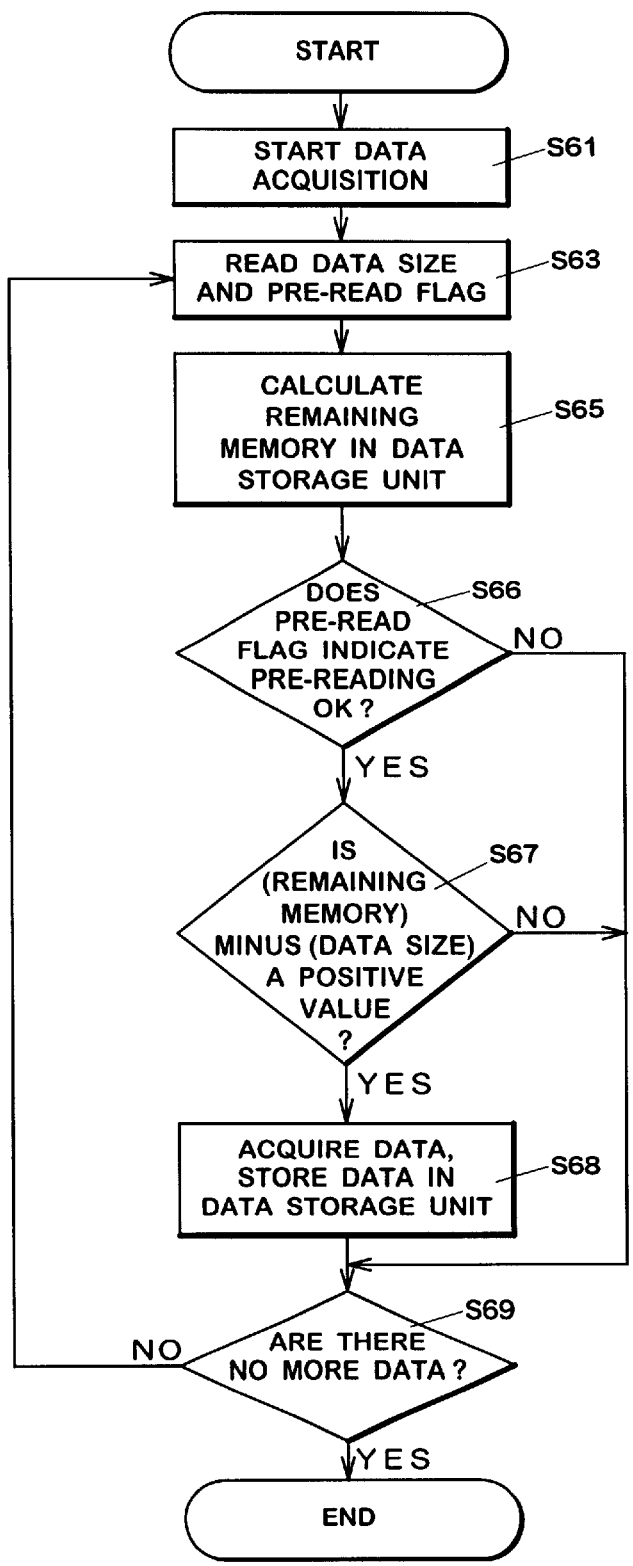
FIG. 38 is a flowchart in another embodiment.

This is almost the same as in the example already described, but differs in that the flag information is acquired when the DII has been acquired and the module ID and module size of each module are obtained therefrom. A specific description is now given using the flowchart in FIG. 38.

Figure 34:
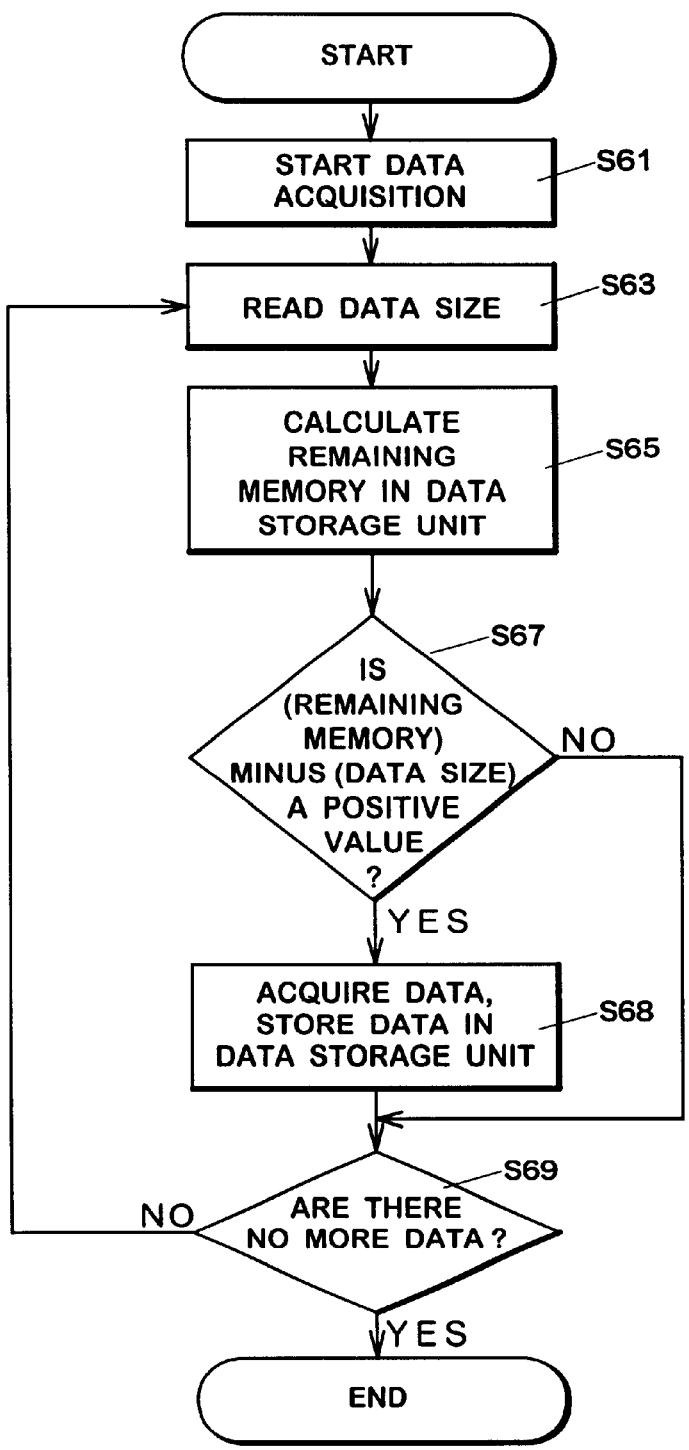
FIG. 34 is a flowchart in this embodiment.

The processing up until the receiving terminal has acquired the DII, acquired the module size for the module 0, and calculated the remaining memory (steps S61 to S65) is the same as diagrammed in FIG. 34.

Next, the pre-read flag for the module ID=1 is checked and a determination is made as to whether or not pre-reading is enabled (step S66). In this case, the flag=1 for the module having the module ID=1, wherefore it is determined that pre-reading is enabled, whereupon the remaining memory is compared with the module size of 70k for the module having the module ID=1 (step S67). In this case, the module having the module ID=1 will not fit in the remaining memory, so it is not acquired.

Similarly, the pre-read flag for the module ID=2 is checked, and a determination is made as to whether or not pre-reading is enabled for the module having the module ID=2 (step S66). In this case, the flag=0 for the module having the module ID=2, wherefore pre-reading is determined to be disabled, and the pre-reading processing routine is not performed.

Such processing is decided for all of the modules (step S69). In this case, no more modules exist, wherefore the pre-reading processing is terminated.

In this manner, the module having the module ID=2 is not pre-read due to the pre-read flag. Accordingly, needless acquisitions can be prevented even when the data in the module having the module ID=2 are being updated. Thus it is possible to implement maximal pre-reading of necessary data witnout pre-reading unneeded data.

This embodiment is configured by hardware, but it may also be configured by software.

With the present invention, as described in the foregoing, by providing a data acquisition decision unit, an outstanding data broadcast receiver can be realized wherewith data can be pre-read without needless waste.

The data acquisition decision unit, in this manner, compares the data size acquired by the data size acquisition unit against the remaining memory calculated by the remaining memory calculation unit, and decides whether or not to acquire the data, thus enabling suitable data to be pre-read. The data acquisition decision unit, meanwhile, performs more appropriate data pre-reading after acquiring pre-read information indicating whether or not data pre-reading is enabled and taking that pre-read information into consideration. As a result, the data broadcast program execution speed, inclusive of data acquisition, can be made faster. Thus the object of speeding up the data broadcast program execution speed, inclusive of data acquisition, at the data broadcast receiving terminal can be attained.

2. Empty Area Controlling Embodiment

In the embodiments described in the foregoing, in a data receiver for receiving packet data transmitted in a carousel sending scheme, only modules that are smaller than the empty capacity are pre-read in order to effectively utilize limited memory capacity.

In cases where the number of modules subject to pre-reading is large relative to the cache capacity, however, those modules will not be cached because of no empty capacity. In the embodiment described below, provision is made so that modules dynamically subject to pre-reading in the cache area in the memory 27 are pre-read into the cache area without fail.

Thus it is possible to shorten the average time for generating display data in a receiver having limited memory area for holding packet data transmitted in a carousel sending scheme. That is so because, even when this is at maximum, there is no need to wait until the next period for the module that has just now been passed.

Figure 39:
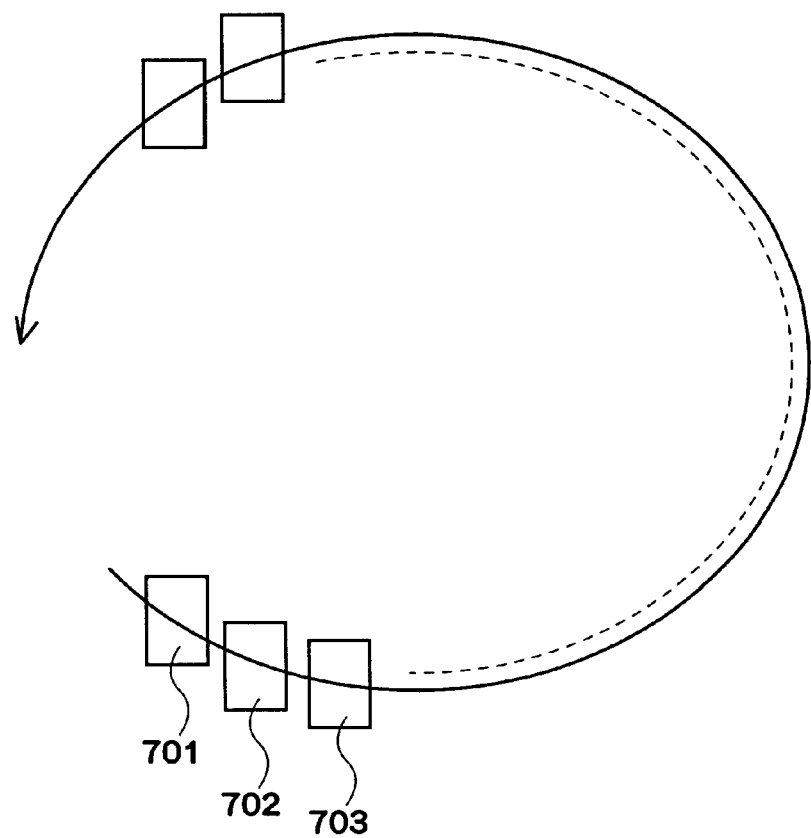
FIG. 39 is diagram for describing data acquisition time in a carousel sending scheme.

Further description is now given using a concrete example. Module data sent in a carousel sending scheme as diagrammed in FIG. 39 are transmitted with a certain periodicity as the module data 701, 702, etc. These module data are selectively received by the TS decoder and sent to the CPU. The modules sent to the CPU are sequentially stored in a cache area. That is, determinations are made as to whether or not the module size (data volume) of each module is larger than the empty capacity of the cache area currently provided in RAM and, when that size is larger, that module is not stored in the cache area. When, for example, the modules 701 and 702 are stored in the cache area, the module 703 will not be so stored when the empty capacity is smaller than the module 703.

There are cases, however, where the module 703 that was not subject to the pre-reading described above is needed for display according to the control input of an operator. In such cases, the CPU must wait to acquire those data until the next module 703 has been transmitted, that is, for one whole period. In the embodiment described below, however, provision is made so that the required empty area is dynamically secured in the memory means for the module which preferably should be pre-read. Hence it is not necessary to wait for a whole period as noted above.

2-1. Block Diagram

Figure 40:
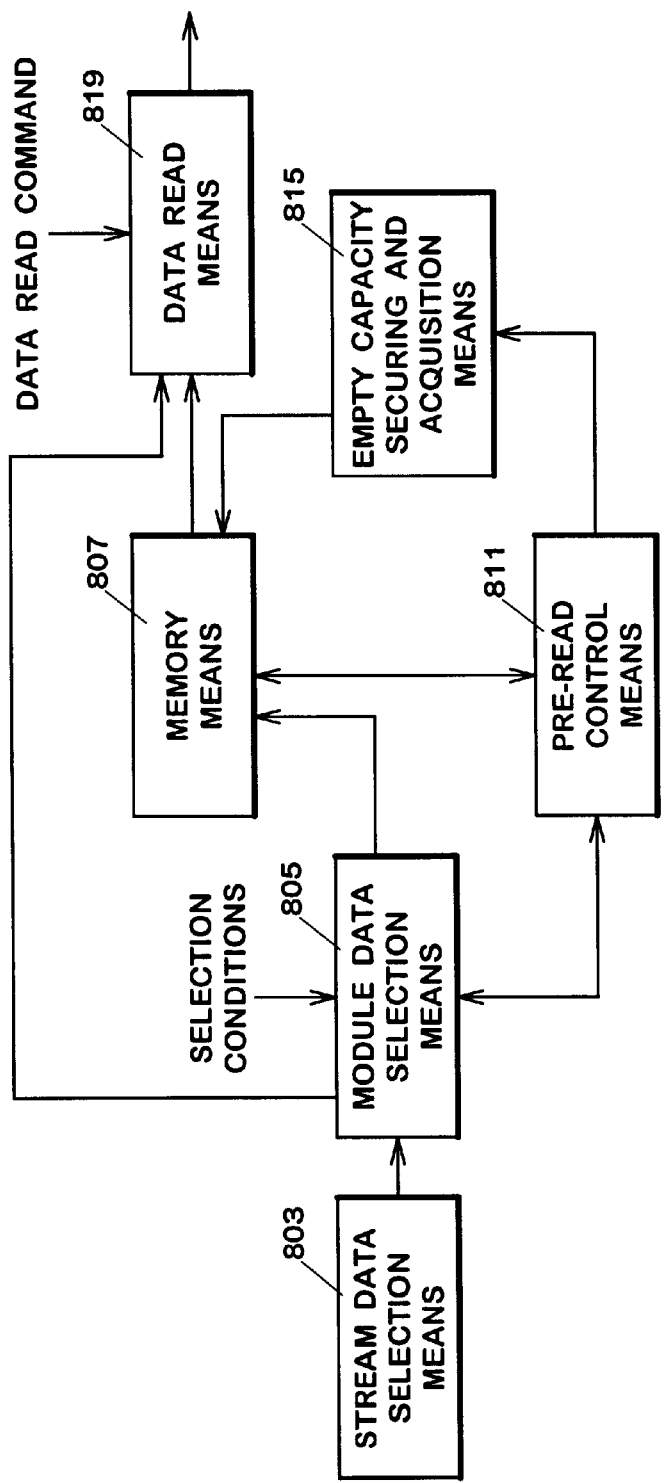
FIG. 40 is a functional block diagram in another embodiment.

FIG. 40 is now used in describing a functional block diagram for a data receiver 801 which secures such empty area. The data receiver 801 is a data receiver which selectively receives, from module data transmitted in a carousel sending scheme with module identifiers attached thereto, those module data specified by prescribed module identifiers, and generates display data, comprising stream data selection means 803, module data selection means 805, memory means 807, data read means 809, pre-read control means 811, and empty capacity securing means 815.

The stream data selection means 803, in the same manner as the stream data selection means 3 described already, from stream data wherein a plurality of services are multiplexed, selectively receives service multiplexed stream data that match given conditions. The same is true for the service multiplexed stream data.

The module data selection means 805 select modules that match given selection conditions and output those module data. The memory means 807 store those output data together with a data storage order. The data read means 809, when a data read command is given, search the memory means 807, read out the needed data, and, when data not present in the memory means 807 are sent from the module data selection means, output those data. The pre-read control means 811 send selection conditions for pre-reading module data associated with data output to the memory means 807 by the module data selection means 805 to the module data selection means 805. The pre-read control means 811 also acquire the data volume of module data subject to the pre-reading noted earlier and send that data volume to the empty capacity securing means 815.

The empty capacity securing means 815, in order to make it possible for module data subject to pre-reading sent from the module data selection means 805 to be pre-read beforehand, delete data in order, beginning from the oldest, from the data stored in the memory means 807, and thus secure empty area larger than the data volume noted above.

2-2. Flowchart

Figure 41:
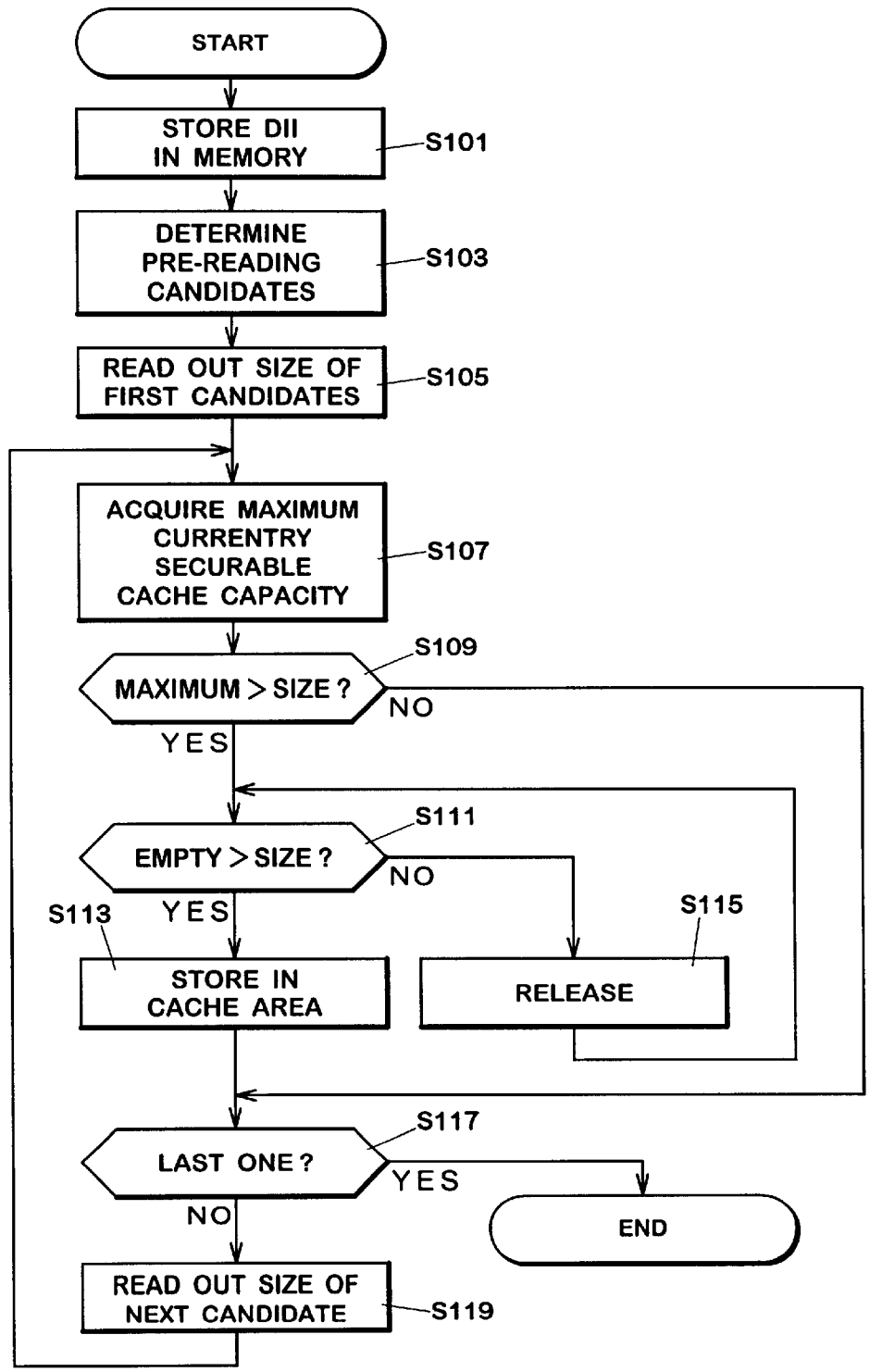
FIG. 41 is a flowchart in another embodiment.

The receiver hardware configuration is the same as in the embodiment described earlier and so is not further described here. A flowchart for the pre-reading program 142d in this case is now described using FIG. 41.

The CPU 147, upon receiving a DII, stores it in RAM 144 (step S101). The CPU 147 references the DII and determines which module data are subject to pre-reading (step S103). Module data belonging to the same category as the module data currently selected may be made subject to pre-reading, for example.

Next, the CPU 147 reads out the module size for the first candidate from the DII (step S105). The CPU 147 finds the current maximum securable cache capacity (step S107). This is done because usable capacity of RAM 144 will differ each time. During the generation of data for passing to the VRAM 146, for example, the maximum securable cache volume in the RAM 144 will be diminished, and, when that generation has been completed, and output is made to the VRAM 146, the capacity of the maximum possible cache area will be increased by that measure. The same will be true when using other computations, etc.

The CPU 147 compares the capacity of the maximum possible cache area and the module size in the candidate module data read out in step S105, and decides whether or not the larger is the capacity of the maximum possible cache area (step S109). When the capacity of the maximum possible cache area is larger, the CPU 147 compares the current cache empty capacity against the module size of the candidate module data read out in step S105 (step S111). When the current cache empty capacity is larger, then the CPU 147 stores those module data as is in the cache area (step S113).

When, on the other hand, the current cache empty capacity is smaller, then the CPU 147 creates empty space in the cache area so that that module data can be stored in the cache area. More specifically, the CPU 147 releases the memory area for the oldest module data (step S115). When the necessary empty space can be made in the cache area, then the processing routine in step S113 is executed.

The CPU 147 decides whether or not any data still remain of the candidate module data determined in step S103 (step S117), and when such does remain, the next candidate module size is read out (step S119). Then the routines from step S107 on are repeated.

Thus, in this embodiment, cache area can be effectively employed by successively caching candidate module data according to the maximum possible cache area capacity that fluctuates dynamically.

Module data that are larger than the maximum possible cache area cannot be completely stored, even when memory space is maximally released, and so are not stored in the cache area. Thus cache area can be employed without needless waste for received data transmitted in a carousel sending scheme. The processing procedure in step S111 need not be executed.

2-3. Other Embodiments

In the embodiment described in the foregoing, the description given is for the case where the capacity of the cache area fluctuates, but that capacity may be made a constant value.

In the embodiment described in the foregoing, module data are cached dynamically using the entire cache area. However, the cache area may also be divided into a plurality of divisions, and module data having different priorities cached in different area divisions. In that case, priorities may be added beforehand at the transmitting end and sent, for example. Of the module data subject to pre-reading, those module data having a priority of 10 or higher might be sequentially stored in a first area division of 500k bytes, and module data having a priority less than 10 sequentially stored in a second area division of 200k bytes, for example. By sequentially storing module data of high priority in a large cache capacity, in this manner, the possibility of being able to shorten the data acquisition time further is raised.

In FIG. 42 is given an example of a case where priorities are written into the BML data. In this case, in lines 1541 and 1542, respectively, the priority of the modules 0001 and 0002 having the component tag 0x40 is noted as 127.

Alternatively, instead of writing the priorities in the BML data, they may be written into a field provided for that purpose in the DII which is the module control information.

Thus, for received data transmitted in a carousel sending scheme, the module data currently being sent become the subject of the most efficient caching because the time until the next sending is the longest. That being so, the most recently sent module data are sequentially cached, and, when there is insufficient cache memory, memory is released in order beginning from the oldest module data. In that way, the data considered for caching can be sequentially determined beginning from the module data requiring the longest acquisition time, and thus the overall average acquisition wait time minimized. Module acquisition wait time can also be shortened even in cases where a cache miss occurs. When 1 megabyte of data is divided into 8 modules and carousel-sent at 1 Mbps, for example, the average module wait time will be approximately 5 seconds and the maximum wait time will be 8 seconds. When, on the other hand, the processing described above is executed with the pre-read cache area capacity made 512k, then, even with (a) module(s) deleted from the cache area, the average wait time will be approximately 3 seconds and the overall module average wait time will be 1.5 seconds.

By dynamically storing acquired module data in the cache area in this manner, the maximum acquisition wait time for received data sent in a carousel sending scheme can be shortened.

It is possible, moreover, to freely combine the invention described in the each embodiment.

In the embodiments described in the foregoing, descriptions are given for cases where the module data are self-descriptive data, but those module data may be a program. Applications can be similarly made, for example, in cases where, from a plurality of divided module programs, a needed module program is selectively received and executed at the terminal end.

1) A data receiver relating to the present invention is a data receiver that, out of module data transmitted in a carousel sending scheme with module identifiers attached, selectively receives module data to which prescribed module identifiers are attached, comprising: (1) module data selection means for selecting module data matching given selection conditions, and outputting those module data (2) memory means capable of storing the data so output, (3) pre-read control means for sending selection conditions for pre-reading module data associated with module data output by the module data selection means to the module data selection means, and (4) empty capacity acquisition means for acquiring empty capacity in the memory means; wherein: (5) the pre-read control means decide whether or not the volume of data in the module data subject to pre-reading is smaller than the empty capacity acquired and, when the volume of data in the module data is smaller, send selection conditions to the module data selection means so that those module data subject to pre-reading are selected.

Thus, by acquiring the empty capacity of the memory means, and sending selection conditions to the module data selection means so that the associated module data are selected when the volume of data in those associated module data is smaller than the empty capacity, those module data are received and stored in the memory means. It is thereby possible to completely pre-read those module data in the memory means. Accordingly, in a data transceiving system wherein data are transmitted in a carousel sending scheme that is meaningless unless data are pre-read in module units, limited memory means can be effectively utilized.

2) In the data receiver relating to the present invention, the pre-read control means reference module control information multiplexed and transmitted in a carousel sending scheme and acquire the volume of data in the module data subject to pre-reading. Accordingly, whether or not a module is to be pre-read into the memory means can be determined merely by acquiring the module control information.

3) In the data receiver relating to the present invention, the pre-read control means reference module control information multiplexed and transmitted in a carousel sending scheme and decide whether or not module data are the associated module data. Accordingly, modules to be pre-read can be determined without judging the contents of all module data.

4) In the data receiver relating to the present invention, category IDs for categories to which the modules belong are stored in the module control information, and modules having the same category ID are judged to be the associated module data. Accordingly, when the same category ID is attached and transmission is done on the transmitting end, module data can be made subject to pre-reading.

5) In the data receiver relating to the present invention, pre-read determining information for determining whether or not to perform pre-reading is stored in the module control information for each module. Accordingly, determinations can be made as to whether or not to perform pre-reading in module units.

6) In the data receiver relating to the present invention, the pre-read determining information is an updating flag, and the pre-read control means remove modules to which that updating flag is attached from being subject to the pre-reading. Accordingly, it can be determined on the sending side whether or not a module should be updated.

7) In the data receiver relating to the present invention, a holding flag is included in the module control information, and the memory means hold modules for which that holding flag is set so that they are not deleted. Thus module data referenced from a plurality of modules can be called at high speed, for example.

8) In the data receiver relating to the present invention, the pre-read control means store prescribed pre-read rules, and determine modules to be pre-read from among modules capable of being pre-read according to the pre-read rules. Accordingly, modules can be pre-read on a priority basis.

9) In the data receiver relating to the present invention, the pre-read rules make modules belonging to the same category as the module currently being read out from the memory means subject to pre-reading. Thus, by pre-reading modules classified in the same category, when associated modules are classified in the same category at and transmitted from the sending end, the memory unit on the receiving end can be used more effectively.

10) In the data receiver relating to the present invention, the pre-read rules make modules coexisting in a plurality of categories subject to pre-reading. It is thereby possible to pre-read module data that can be referenced from other categories as well.

11) In the data receiver relating to the present invention, the pre-read rules pre-read modules having high pre-read priorities on a priority basis. Thus, by transmitting modules for which pre-reading is desired after making the pre-read priority thereof high, faster data acquisition is made possible with limited memory capacity.

12) In the data receiver relating to the present invention, the pre-read control means pre-read modules having a high pre-read priority on a priority basis, based on pre-reading decision criteria. Thus faster data acquisition is possible with limited memory capacity, based on the pre-read decision criteria.

13) In the data receiver relating to the present invention, the module control information is imbedded in a DII in the DSM-CC standard. Accordingly, the modules can be pre-read merely by reading in the DII which is formal information.

14) In the data receiver relating to the present invention, which is a data receiver that, out of module data transmitted in a carousel sending scheme with module identifiers attached, selectively receives module data to which prescribed module identifiers are attached, and which comprises: (1) module data selection means for selecting module data matching given selection conditions, and outputting those module data, (2) memory means capable of storing the data so output, (3) pre-read control means for sending selection conditions for pre-reading module data associated with data output by the module data selection means to the module data selection means, and (4) empty capacity acquisition means for acquiring empty capacity in the memory means; (5) the pre-read control means decide whether or not the volume of data in the module data subject to pre-reading is smaller than the empty capacity acquired and, when that volume is not smaller, do not send those module data subject to pre-reading to the module data selection means which send selection conditions for selecting, until a command is sent from an operator to receive those module data. Accordingly, in a data transceiving system wherein data are transmitted in a carousel sending scheme that is meaningless unless data are pre-read in module units, limited memory means can be effectively utilized.

15) In the data receiver relating to the present invention, which is a data receiver that, out of module data transmitted in a carousel sending scheme with module identifiers attached, selectively receives module data to which prescribed module identifiers are attached, and which comprises: (1) module data selection means for selecting module data matching given selection conditions, and outputting those module data, (2) memory means capable of storing the data so output, (3) pre-read control means for sending selection conditions for pre-reading module data associated with module data output from the module data selection means to the module data selection means, (4) empty capacity acquisition means for acquiring empty capacity in the memory means, and (5) total data volume acquisition means for acquiring the total data volume of module data belonging to a group; (6) the pre-read control means decide whether or not the total data volume in a group to which the module data subject to pre-reading belong is smaller than the empty capacity acquired and, when that total volume is smaller, send selection conditions to the module data selection means so that all module data belonging to that group are selected. Accordingly, the module data belonging to that group can be made subject to pre-reading.

16) In the data receiver relating to the present invention, which is a data receiver that, out of module data transmitted in a carousel sending scheme with module identifiers attached, selectively receives module data to which prescribed module identifiers are attached, and which comprises: (1) module data selection means for selecting module data matching given selection conditions, and outputting those module data (2) memory means for storing the data so output together with a data storage order, (3) data read means for searching the memory means and reading out needed data when a data read command is sent thereto and, together therewith, when data not present in the memory means are sent from the module data selection means, outputting all those data, (4) pre-read control means for sending selection conditions to the module data selection means for pre-reading module data associated with the data output to the memory means from the module data selection means; (5) empty capacity securing means are further comprised for deleting data in order, beginning from the oldest, from data stored in the memory means, and thus, in order that module data subject to pre-reading sent from the module data selection means will be pre-read beforehand in the memory means, securing empty area larger than volume of those data. Accordingly, even with modules sent in carousel fashion, those are first stored in memory means, and, when needed data are stored in the memory means, the data read means read out those data. Thus, in a data transceiving system wherein data are transmitted in a carousel sending scheme that is meaningless unless data are pre-read in module units, the maximum acquisition time until acquisition of needed module data can be shortened.

17) In the data receiver relating to the present invention, the pre-read control means reference the module control information multiplexed and transmitted in the carousel sending scheme, acquire the volume of data in the module data subject to pre-reading, and pass that volume to the empty capacity securing means, and the empty capacity securing means secure the necessary empty capacity using that given data volume. Accordingly, empty capacity for pre-reading can be secured in the memory means merely by acquiring the module control information. Thus the needed empty capacity can be secured without judging the contents of all the module data.

18) In the data receiver relating to the present invention, the pre-read control means reference the module control information multiplexed and transmitted in the carousel sending scheme, and make only associated module data subject to pre-reading. Thus, when associated modules are classified in the same category at and transmitted from the sending end, by pre-reading modules classified in the same category, the memory unit on the receiving end can be utilized more effectively.

19) In the data receiver relating to the present invention, the category IDs of categories to which modules belong are stored in the module control information, and modules having the same category id are judged to be the associated module data. Accordingly, when the same category id is attached at and transmission is made from the sending end, those data are made subject to pre-reading, and can be pre-read into the memory means without fail.

20) In the data receiver relating to the present invention, which further comprises maximum storable capacity acquisition means for acquiring the current maximum storable capacity in the memory means, the empty capacity securing means do not secure the empty area in the memory means when the volume of data in the module data subject to pre-reading sent from the module data selection means is larger than the current maximum storable capacity. Accordingly, particular module data can be made subject to pre-reading only when they can be pre-read, according to the current maximum storable capacity.

21) In the data receiver relating to the present invention, pre-read determining information for determining whether or not pre-reading is to be done is stored in the module control information for each module. Accordingly, determinations can be made as to whether or not do perform pre-reading in module units.

22) In the data receiver relating to the present invention, the pre-read determining information is an updating flag, and the pre-read control means remove modules in which the updating flag is set from being subject to pre-reading. Accordingly, determinations can be made as to whether or not a module is one which is not to be pre-read.

23) In the data receiver relating to the present invention, the module control information is imbedded in a DII in the DSM-CC standard. Accordingly, the modules can be pre-read without fail merely by reading in the DII which is formal information.

By "data receiver," in the present invention, is meant a unit that can at least selectively receive desired transport streams and services from a plurality of transport streams. This is a concept which includes a so-called set top box, a video deck having built-in set top box functions, and a television with built in set top box functions, etc.

"Module data selection means" correspond to the TS decoder 141 in the embodiments.

By "self-descriptive data" are meant data to which are added display designating information such as information pertaining to deployment positions, text string size, and graphic data to be referenced with displaying text data. Such data include, for example, SGML data, HTML data, XML data, and MHEG standard data, etc.

By "recording medium whereon a program is recorded" is meant a recording medium such as ROM, RAM, hard disk, flexible disk, or CD-ROM, etc., whereon is recorded a program which is executable by a CPU. Such a program is not limited to one that can be immediately executed by a CPU, moreover, and includes programs that require installation, that are compressed, or that are encrypted.

While the embodiments of the present invention, as disclosed herein, constitute preferred forms, it is to be understood that each term was used as illustrative and not restrictive, and can be changed within the scope of the claims without departing from the scope and spirit of the invention.

What is claimed is:

1. A data receiver that, out of module data transmitted in a carousel sending scheme with module identifiers attached, selectively receives module data to which prescribed module identifiers are attached, comprising:
   module data selection means for selecting module data matching given selection conditions, and outputting those module data;
   memory means capable of storing said data so output;
   pre-read control means for sending selection conditions for pre-reading module data associated with module data output by said module data selection means to said module data selection means; and
   empty capacity acquisition means for acquiring empty capacity in said memory means; wherein:
   said pre-read control means decide whether or not volume of data in said module data subject to pre-reading is smaller than said empty capacity acquired and, when said volume of data in said module data is smaller, send selection conditions to said module data selection means so that those module data subject to pre-reading are selected.

2. The data receiver according to claim 1, wherein said pre-read control means determine whether or not module data are said associated module data with module control information multiplexed and transmitted in said carousel sending scheme.

3. The data receiver according to claim 2, wherein category IDs for categories to which modules belong are stored in said module control information, and modules having same category ID are determined to be said associated module data.

4. A data receiver that, out of module data transmitted in a carousel sending scheme with module identifiers attached, selectively receives module data to which prescribed module identifiers are attached, comprising:
   module data selection means for selecting module data matching given selection conditions, and outputting those module data;

memory means capable of storing said data so output, pre-read control means for sending selection conditions for pre-reading module data associated with module data output by said module data selection means to said module data selection means;

empty capacity acquisition means for acquiring empty capacity in said memory means; and module control information receiving means for receiving module control information for said module data; wherein:

said pre-read control means determine whether or not volume of data in said module data subject to pre-reading is smaller than said acquired empty capacity with said module control information, and, when said volume of data in said module data is smaller, send selection conditions to said module data selection means so that said module data subject to pre-reading are selected.

5. The data receiver according to claim 4, wherein pre-read determining information for determining whether or not to pre-read is stored in said module control information, for each module.

6. The data receiver according to claim 4, wherein said pre-read determining information is an updating flag, and said pre-read control means remove modules to which that updating flag is attached from being subject to said pre-reading.

7. The data receiver according to claim 4, wherein a holding flag is included in said module control information, and said memory means hold modules for which that holding flag is set so that they are not deleted.

8. The data receiver according to claim 4, wherein said pre-read control means store prescribed pre-read rules, and determine modules to be pre-read from among modules capable of being pre-read according to said pre-read rules.

9. The data receiver according to claim 8, wherein said pre-read rules make modules belonging to same category as the module currently being read out from said memory means subject to pre-reading.

10. The data receiver according to claim 8, wherein said pre-read rules make modules coexisting in a plurality of categories subject to pre-reading.

11. The data receiver according to claim 8, wherein said pre-read control means pre-read modules having high pre-read priority on a priority basis, based on pre-reading decision criteria.

12. The data receiver according to claim 4, wherein said module control information is imbedded in a DII in DSM-CC standard.

13. A data receiver that, out of module data transmitted in a carousel sending scheme with module identifiers attached, selectively receives module data to which prescribed module identifiers are attached, comprising:

module data selection means for selecting module data matching given selection conditions, and outputting those module data;

memory means capable of storing said data so output;

pre-read control means for sending selection conditions for pre-reading module data associated with module data output by said module data selection means to said module data selection means;

empty capacity acquisition means for acquiring empty capacity in said memory means; and module control information receiving means for receiving module control information for said module data; wherein:

pre-read determining information for pre-reading, on a priority basis, modules having a high pre-read priority is stored in said module control information, for each module; and said pre-read control means determine whether or not volume of data in said module data subject to said pre-reading is smaller than said acquired empty capacity with said pre-read determining information, and, when said volume of data in said module data is smaller, send selection conditions to said module data selection means so that said module data subject to pre-reading are selected.

14. A data receiver that, out of module data transmitted in a carousel sending scheme with module identifiers attached, selectively receives module data to which prescribed module identifiers are attached, comprising:

module data selection means for selecting module data matching given selection conditions, and outputting those module data;

memory means capable of storing said data so output;

pre-read control means for sending selection conditions for pre-reading module data associated with module data output by said module data selection means to said module data selection means; and empty capacity acquisition means for acquiring empty capacity in said memory means; wherein:

said pre-read control means decide whether or not volume of data in said module data subject to pre-reading is smaller than said acquired empty capacity and, when that volume is not smaller, do not send those module data subject to pre-reading to said module data selection means which send selection conditions for selecting, until a command is sent from an operator to receive those module data.

15. A data receiver that, out of module data transmitted in a carousel sending scheme with module identifiers attached, selectively receives module data to which prescribed module identifiers are attached, comprising:

module data selection means for selecting module data matching given selection conditions, and outputting those module data;

memory means capable of storing said data so output; and pre-read control means for sending selection conditions for pre-reading module data associated with module data output by said module data selection means to said module data selection means;

said data receiver further comprising:

empty capacity acquisition means for acquiring empty capacity in said memory means; and total data volume acquisition means for acquiring total data volume of module data belonging to a group; wherein:

said pre-read control means decide whether or not total data volume in a group to which said module data subject to pre-reading belong is smaller than said acquired empty capacity and, when said total data volume is smaller, send selection conditions to said module data selection means so that all module data belonging to that group are selected.

16. A data receiver that, out of module data transmitted in a carousel sending scheme with module identifiers attached, selectively receives module data to which prescribed module identifiers are attached, comprising:

module data selection means for selecting module data matching given selection conditions, and outputting those module data;

memory means for storing said data so output;

data read means for searching said memory means and reading out needed data when a data read command is sent thereto;

pre-read control means for sending selection conditions to said module data selection means for pre-reading module data associated with data output to said memory means by said module data selection means; and empty capacity securing means for securing empty area in said memory means larger than said data volume, so that module data subject to pre-reading sent from said module data selection means will be pre-read beforehand in said memory means.

17. The data receiver according to claim 16, wherein said pre-read control means transmitted in said carousel sending scheme with said module control information multiplexed, and make only associated module data subject to pre-reading.

18. The data receiver according to claim 17, wherein category IDs of categories to which modules belong are stored in said module control information, and modules having same category ID are judged to be said associated module data.

19. A data receiver that, out of module data transmitted in a carousel sending scheme with module identifiers attached, selectively receives module data to which prescribed module identifiers are attached, comprising:

module data selection means for selecting module data matching given selection conditions, and outputting those module data;

memory means for storing said data so output;

data read means for searching said memory means and reading out needed data when a data read command is sent thereto;

pre-read control means for sending selection conditions to said module data selection means for pre-reading module data associated with data output to said memory means by said module data selection means;

empty capacity securing means for securing empty area in said memory means larger than said data volume, so that module data subject to pre-reading sent from said module data selection means will be pre-read beforehand in said memory means; and module control information receiving means for receiving module control information for said module data; wherein:

said pre-read control means acquire volume of data in said module data subject to pre-reading with reference said module control information, and send said data volume to said empty capacity securing means; and said empty capacity securing means secure needed empty capacity using data volume so provided.

20. The data receiver according to claim 19, wherein said module control information is imbedded in a DII in DSM-CC standard.

21. A data receiver that, out of module data transmitted in a carousel sending scheme with module identifiers attached, selectively receives module data to which prescribed module identifiers are attached, comprising:

module data selection means for selecting module data matching given selection conditions, and outputting those module data;

memory means for storing said data so output;

data read means for searching said memory means and reading out needed data when a data read command is sent thereto;

pre-read control means for sending selection conditions to said module data selection means for pre-reading module data associated with data output to said memory means by said module data selection means;

empty capacity securing means for securing empty area in said memory means larger than said data volume, so that module data subject to pre-reading sent from said module data selection means will be pre-read beforehand in said memory means; and maximum storable capacity acquisition means for acquiring current maximum storable capacity in said memory means; wherein:

said empty capacity securing means do not secure said empty area in said memory means when volume of data in module data subject to pre-reading sent from said module data selection means is larger than said current maximum storable capacity.

22. The data receiver according to claim 21, wherein pre-read determining information for determining whether or not pre-reading is to be done is stored in said module control information for each module.

23. The data receiver according to claim 21, wherein said pre-read determining information is an updating flag, and said pre-read control means remove modules in which said updating flag is set from being subject to pre-reading.

24. A recording medium wherein:

a program is recorded for causing pre-read processing to be executed in a data receiver which, from module data transmitted in a carousel sending scheme with module identifiers attached, selectively receives module data to which prescribed module identifiers are attached, said data receiver comprising:

module data selection means for selecting module data matching given selection conditions and outputting those module data; and memory means capable of storing said output data; and said program acquires empty capacity in said memory means, determines whether or not volume of data in module data associated with module data output from said module data selection means is smaller than said acquired empty capacity, and, when volume of data in said module data is smaller, sends selection conditions for selecting those module data to said module data selection means.

25. A recording medium wherein:

a program is recorded for causing pre-read processing to be executed in a data receiver which, from module data transmitted in a carousel sending scheme with module identifiers attached, selectively receives module data to which prescribed module identifiers are attached, said data receiver comprising:

module data selection means for selecting module data matching given selection conditions and outputting those module data;

module control information receiving means for receiving module control information for said module data; and memory means capable of storing said output data; and said program acquires empty capacity in said memory means determines whether or not volume of data in module data associated with module data output from said module data selection means is smaller than said acquired empty capacity with said module control information, and, when volume of data in said module data is smaller, sends selection conditions for selecting those module data to said module data selection means.

26. A recording medium wherein:
a program is recorded for causing pre-read processing to be executed in a data receiver which, from module data transmitted in a carousel sending scheme with module identifiers attached, selectively receives module data to which prescribed module identifiers are attached, said data receiver comprising:
  module data selection means for selecting module data matching given selection conditions and outputting those module data;
  module control information receiving means for receiving module control information for said module data; and
  memory means capable of storing said output data;
  pre-read determining information for pre-reading, on a priority basis, modules having high pre-read read priority is stored in said module control information, for each module; and
  said program acquires empty capacity in said memory means determines whether or not volume of data in module data associated with module data output from said module data selection means is smaller than said acquired empty capacity with said pre-read determining information, and, when volume of data in said module data is smaller, sends selection conditions for selecting those module data to said module data selection means.

27. A recording medium wherein:
a program is recorded for causing pre-read processing to be executed in a data receiver which, from module data transmitted in a carousel sending scheme with module identifiers attached, selectively receives module data to which prescribed module identifiers are attached, said data receiver comprising:
module data selection means for selecting module data matching given selection conditions and outputting those module data; and
memory means capable of storing said output data; and
said program acquires empty capacity in said memory means, determines whether or not volume of data in module data associated with module data output from said module data selection means is smaller than said acquired empty capacity, and, when volume of data in said module data is larger, does not send selection conditions for selecting those module data to said module data selection means.

28. A recording medium wherein:
a program is recorded for causing pre-read processing to be executed in a data receiver which, from module data transmitted in a carousel sending scheme with module identifiers attached, selectively receives module data to which prescribed module identifiers are attached, said data receiver comprising:
  module data selection means for selecting module data matching given selection conditions and outputting those module data; and
  memory means capable of storing said output data; and
  said program acquires empty capacity in said memory means and also total data volume of module data belonging to a certain group, determines whether or not total data volume of a group to which belong module data associated with module data output from said module data selection means is smaller than said acquired empty capacity, and, when said total data volume is smaller, does not send selection conditions for selecting all module data belonging to that group to said module data selection means.

29. A recording medium wherein:
a program is recorded for causing pre-read processing to be executed in a data receiver which, from module data transmitted in a carousel sending scheme with module identifiers attached, selectively receives module data to which prescribed module identifiers are attached, said data receiver comprising:
module data selection means for selecting module data matching given selection conditions and outputting those module data; and
memory means for storing said output data; and
said program sends selection conditions for pre-reading module data associated with data output by said module data selection means to said memory means, to said module data selection means and secures empty area in said memory means larger than said data volume, so that module data subject to pre-reading sent from said module data selection means will be pre-read beforehand in said memory means, and, when a data read command is given, searches said memory means and reads out needed data.

30. A recording medium wherein:
a program is recorded for causing pre-read processing to be executed in a data receiver which, from module data transmitted in a carousel sending scheme with module identifiers attached, selectively receives module data to which prescribed module identifiers are attached, said data receiver comprising:
  module data selection means for selecting module data matching given selection conditions and outputting those module data;
  module control information receiving means for receiving module control information for said module data; and
  memory means for storing said output data;
  said program sends selection conditions for pre-reading module data associated with data output by said module data selection means to said memory means, to said module data selection means and secures empty area in said memory means larger than this data volume with said module control information, so that module data subject to pre-reading sent from said module data selection means will be pre-read beforehand in said memory means, and, when a data read command is given, searches said memory means and reads out needed data.

31. A recording medium wherein:
a program is recorded for causing pre-read processing to be executed in a data receiver which, from module data transmitted in a carousel sending scheme with module identifiers attached, selectively receives module data to which prescribed module identifiers are attached, said data receiver comprising:
  module data selection means for selecting module data matching given selection conditions and outputting those module data; and
  memory means for storing said output data; and
  said program sends selection conditions for pre-reading module data associated with data output by said module data selection means to said memory means, to said module data selection means and when volume of data in module data subject to pre-reading sent from said module data selection means is smaller than current maximum storable capacity, secures empty area in said memory means larger than said data volume, so that module data subject to pre-reading sent from said module data selection means will be pre-read beforehand in said memory means, and, when a data read command is given, searches said memory means and reads out needed data.

32. A data receiver comprising:

a tuner for selectively receiving a prescribed transport stream;

a transport decoder for outputting, from said selectively received transport stream data, module data matching designated filtering conditions;

a cache area for temporarily storing module data output from said transport decoder; and a CPU for controlling said tuner, said transport decoder, and said cache area; wherein:

said CPU sends filtering conditions for pre-reading module data associated with module data output from said transport decoder, to said transport decoder;

said CPU computes empty capacity in said cache area;

said CPU, when there exists module control information for module data in said cache area, causes that information to be stored in said cache area;

pre-read determining information for pre-reading, on a priority basis, modules having high pre-read priority is stored in said module control information, for each module; and said CPU determines whether or not volume of data in said module data subject to pre-reading is smaller than said acquired empty capacity with said pre-read determining information and when volume of data in said module data is smaller, modifies filtering conditions in said transport decoder so that those module data subject to pre-reading are selected.

33. A data receiver comprising:

a tuner for selectively receiving a prescribed transport stream;

a transport decoder for outputting, from said selectively received transport stream data, module data matching designated filtering conditions;

a cache area for temporarily storing module data output from said transport decoder; and a CPU for controlling said tuner, said transport decoder, and said cache area; wherein:

said CPU sends filtering conditions for pre-reading module data associated with module data output from said transport decoder in said cache area, to said transport decoder, and secures empty capacity larger than said module data subject to pre-reading in said cache area.

* * * * *